(12) United States Patent
Yoshizawa et al.

(10) Patent No.: US 7,571,207 B2
(45) Date of Patent: Aug. 4, 2009

(54) PUSH-TYPE INFORMATION DELIVERY METHOD, PUSH-TYPE INFORMATION DELIVERY SYSTEM, INFORMATION DELIVERY APPARATUS AND CHANNEL SEARCH APPARATUS BASED ON PRESENCE SERVICE

(75) Inventors: Masahiro Yoshizawa, Kokubunji (JP); Kenji Kasuga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 946 days.

(21) Appl. No.: 10/893,316

(22) Filed: Jul. 19, 2004

(65) Prior Publication Data

US 2005/0251557 A1  Nov. 10, 2005

(30) Foreign Application Priority Data

May 6, 2004  (JP)  ............................. 2004-136989

(51) Int. Cl.
*G06F 15/16*  (2006.01)

(52) U.S. Cl. ....................................... 709/203; 709/228

(58) Field of Classification Search ................. 709/217, 709/228, 227, 201
See application file for complete search history.

(56) References Cited

U.S. PATENT DOCUMENTS

| | | | |
|---|---|---|---|
| 6,035,336 A * | 3/2000 | Lu et al. ..................... | 709/232 |
| 2003/0208545 A1* | 11/2003 | Eaton et al. ................. | 709/206 |
| 2004/0003037 A1* | 1/2004 | Fujimoto et al. ............ | 709/203 |
| 2005/0021773 A1* | 1/2005 | Shiga et al. ................. | 709/228 |

* cited by examiner

*Primary Examiner*—Ario Etienne
*Assistant Examiner*—Marshall McLeod
(74) *Attorney, Agent, or Firm*—Reed Smith LLP; Juan Carlos A. Marquez, Esq.

(57) ABSTRACT

Providing a new contents delivery method that is suitable for community networks and reduces leaks of personal information. Presentities indicating channels for information delivery are formed on presence service, and virtual channel communication terminals corresponding to their presentities are logically formed on an information delivery server. Thereby, contents are transmitted and received between the information delivery server and user communication terminals, and among the user communication terminals as if the contents were transmitted and received between a presentity indicating a channel and a presentity indicating a user. During contents transmission and reception, the need to exchange address information among users is eliminated, making it possible to prevent leaks of personal information.

10 Claims, 24 Drawing Sheets

FIG. 6

| CHANNEL NO. | PRESENTITY IDENTIFIER OF CHANNEL | CHANNEL NAME | INTRODUCTION PHRASE |
|---|---|---|---|
| 1 | cake@example.co.jp | CAKE FROM AIR | INFORMATION ABOUT RECOMMENDABLE CAKE SHOPS IS BEING DELIVERED. |
| 2 | weather@example.co.jp | WEATHER FORECAST | DAILY WEATHER INFORMATION IN THE VICINITY OF CURRENT LOCATION.... |
| ... | ... | | ... |

FIG. 7

| CHANNEL NO. | PRESENTITY IDENTIFIER OF USER | NICKNAME | AUTHORITY | STATUS | PAST DELIVERY RECORDS (CONTENTS NO. ALREADY DELIVERED) | PAST DELIVERY RECORDS (LAST DELIVERY TIME) |
|---|---|---|---|---|---|---|
| 1 | alice@example.co.jp | ALICE | ADMINISTRATOR | PRESENT | | |
| 1 | bob@example.co.jp | BOB | GENERAL | ABSENT | 1, 3, 4, 5 ... | 2004/01/08 08:01:23 |
| 1 | charlie@example.co.jp | CHARLIE | GENERAL | PRESENT | 2 | 2004/01/08 12:30:32 |
| ... | ... | ... | ... | ... | ... | ... |
| 2 | weather-com@example.co.jp | WEATHER FORECASTER | ADMINISTRATOR | PRESENT | | |
| 2 | bob@example.co.jp | BOB | GENERAL | PRESENT | | 2004/01/08 14:54:10 |
| 2 | dolothy@example.co.jp | DOLOTHY | GENERAL | PRESENT | | 2004/01/08 10:00:05 |
| ... | ... | ... | ... | ... | ... | ... |

FIG. 8

| DELIVERY CONTENTS NO. | CHANNEL NO. | DELIVERY CONDITION | CONTENTS TYPE | CONTENTS | DELIVERY COUNT | VALIDITY TERM |
|---|---|---|---|---|---|---|
| 1 | 1 | WITHIN 100 m FROM A LOCATION OF LATITUDE 35.4211 AND LONGITUDE 139.2827 | TEXT | ★RECOMMENDABLE ITEMS OF CAKE SHOP A.... | ONCE | UNLIMITED |
| 2 | 1 | WITHIN 100 m FROM A LOCATION OF LATITUDE 35.4149 AND LONGITUDE 139.2902 | TEXT | ▼TERM LIMITED▼.... | ONCE | UNTIL JANUARY 1 |
| ⋮ | ⋮ | ⋮ | ⋮ | ⋮ | ⋮ | ⋮ |
| 145 | 2 | NORTHERN AREA OF SAITAMA PREFECTURE NOT DELIVERED FROM THIS CHANNEL WITHIN PAST THREE HOURS | TEXT | IN NORTHERN AREA OF SAITAMA PREFECTURE.... | UNLIMITED | UNTIL 6 P.M. |
| 146 | 2 | CHICHIBU AREA OF SAITAMA NOT DELIVERED FROM THIS CHANNEL WITHIN PAST THREE HOURS | TEXT | IN CHICHIBU AREA OF SAITAMA PREFECTURE.... | UNLIMITED | UNTIL 6 P.M. |
| ⋮ | ⋮ | ⋮ | ⋮ | ⋮ | ⋮ | ⋮ |

FIG. 9

| CHANNEL NO. | PRESENTITY IDENTIFIER OF SOURCE USER | PRESENTITY IDENTIFIER OF DESTINATION USER | CONTENTS TYPE | CONTENTS |
|---|---|---|---|---|
| 1 | bob@example.co.jp | alice@example.co.jp | TEXT | THE INDICATED NEW PRODUCT ... |
| 1 | alice@example.co.jp | charlie@example.co.jp | TEXT | THANK YOU FOR YOUR THOUGHT ... |
| ... | ... | ... | | ... |

FIG. 16 send message

From: BOB <bob@example.co.jp>
To: CAKE FROM AIR <cake@example.co.jp>

THE INDICATED NEWLY PRODUCED CAKE WAS VERY DELICIOUS. A SHORTCAKE IN THIS SHOP, THOUGH NOT NEWLY PRODUCED, IS RECOMMENDABLE. PLEASE TASTE IT IF YOU DO NOT YET.

FIG. 17 receive message

From: CAKE FROM AIR <cake@example.co.jp>
To: ALICE <alice@example.co.jp>

[MESSAGE FROM BOB]
THE INDICATED NEWLY PRODUCED CAKE WAS VERY DELICIOUS. A SHORTCAKE IN THIS SHOP, THOUGH NOT NEWLY PRODUCED, IS RECOMMENDABLE. PLEASE TASTE IT IF YOU DO NOT YET.

FIG. 20

| WORD | SEARCH CONTENTS NO. OF DELIVERY CONTENTS CONTAINING THE WORD |
|---|---|
| CAKE | 1, 6, 7, 15, ... |
| WEATHER | 3, 4, 5, 8, ... |
| ... | ... |

FIG. 21

| SEARCH CONTENTS NO. | CHANNEL NO. | DELIVERY CONDITION | CONTENTS TYPE | CONTENTS | RANK |
|---|---|---|---|---|---|
| 1 | 1 | WITHIN 100 m FROM A LOCATION OF LATITUDE 35.4211 AND LONGITUDE 139.2827 | TEXT | ★RECOMMENDABLE ITEMS OF CAKE SHOP A .... | 8.2 |
| 2 | 2 | NORTHERN AREA OF SAITAMA PREFECTURE | TEXT | .... IN NORTHERN AREA OF SAITAMA PREFECTURE | 3.5 |
| ... | | ... | ... | ... | ... |

PUSH-TYPE INFORMATION DELIVERY METHOD, PUSH-TYPE INFORMATION DELIVERY SYSTEM, INFORMATION DELIVERY APPARATUS AND CHANNEL SEARCH APPARATUS BASED ON PRESENCE SERVICE

CLAIM OF PRIORITY

The present application claims priority from Japanese application JP 2004-136989 filed on May 6, 2004, the contents of which is hereby incorporated by reference into this application.

FIELD OF THE INVENTION

The present invention relates to a push-type information delivery method and an information delivery system using terminal apparatuses that can use presence service, and the terminal apparatuses.

BACKGROUND OF THE INVENTION

Recently, with the widespread use of wireless information terminals such as cellular phones, and the development of position information acquisition technology by wireless technology and GPS (Global Positioning System), information delivery service combined with position information has been brought into operation. Users transmit position information to carriers or service providers tying up with the carriers, thereby enjoying service of delivery of information and contents in accordance with the position information. The information and contents in accordance with position information are, for example, a map, a weather forecast, and traffic information in the vicinity of a current position.

Users enjoy information delivery service by push-type and pull-type methods. With the pull-type method, the users issue an information delivery request to a service provider, which starts information delivery upon receipt of the request. On the other hand, regardless of users' requests, the service provider delivers information without permission upon some change of user status. As a push-type information delivery method, the method of delivering specific contents based on users' position information is particularly in widespread use. For example, if users subscribe to their favorite channels (weather forecast channel, local news channel, etc.), from that time onward, without waiting for position information from the users, position information is transmitted to a carrier or a contents provider tying up with the carrier, and information suitable for the user's position information is selected from among contents of the channels and delivered.

User participatory position information service is also available. According to this service, without unidirectionally receiving information delivery, users can transmit information of their own will. For example, users register messages to be transmitted in a dedicated server together with their position information, and the registered messages are transmitted to other users whose current position satisfies specific conditions.

Presently, the above-mentioned position information, together with other user attribute information (e.g., name, age, sex, etc.), is often represented by the term presence information. Presently, various services using presence information are devised, and services using presence information will come into widespread use in future. As of this point in time, the most popular service is an instant messenger. To use the instant messenger, users install dedicated software in a terminal and start the software to connect to a network. Then, since it can be determined whether a communication party connects currently to the network, if the communication party has started the same software, messages can be exchanged in real time.

Accordingly, to use the instant messenger, the users must provide their presence information indicating whether they connect to the network, and further acquire presence information of the communication party as well. Hence, the users must have an account on presence service provided by service providers. Such an account is refereed to as presentity. Also in this specification, the term presentity will be used in descriptions below. The users have a list (hereinafter referred to as a buddy list) for registering and managing presentities of communication parties, and exchange presence information with presentities included in the buddy list.

To register a presentity in the buddy list, using the identifier of presentity of a communication party (hereinafter referred to as a presentity identifier) obtained by some method, push-type notification of presence information to the presentity is filed. Hereinafter, this is referred to as subscribe. If users subscribe to the communication party, the fact is notified to the party through a presence server or directly from the users, and the party can determine whether the presence information should be released, for each of the users. Most of instant messages using presence service by using this mechanism have a function for preventing spam by shutting out messages from other than presentities registered in the buddy list.

A recent investigation has reported that the utilization rate of instant messengers as PC applications have exceeded that of Web browsers. In future, such software will come into widespread use as an application of cellular phones. With the forecast in view, standardization groups such as IETF (Internet Engineering Task Force) is studying a system for handling users' position information as part of presence information.

SUMMARY OF THE INVENTION

The following poses problems with position information service, particularly push-type information delivery service using position information.

In the present situation, enterprises to provide position information service must closely tie up with cellular phone carriers to receive the supply of users' position information. Since procedures for achieving it and the reservation of servers and lines require considerable costs, enterprises to deliver contents by using the position information service are limited to carriers or dedicated contents providers. Also, the contents concentrate lopsidedly in advertisements or chargeable items recognized as useful. If the costs can be reduced by some means so that general users and enterprises other than contents providers can easily use the position information service to deliver contents, the above-mentioned lopsided concentration would decrease and contents would become diversified. Such service is expected to develop new communications among users.

However, as in conventional user-participatory position information service, the method by which anyone can register messages in one or few spaces will escalate the spam problem as found in mail as the service comes into widespread use. This is serious to particularly push-type information delivery service. Therefore, the user-participatory position information service must also have means by which a user filters receiving messages by transmission source, such as channels in enterprise-operated information delivery service.

Conversely, it may become problematic in terms of privacy that users to register messages include their information (user identifier, etc.) in messages that may be viewed by an unspecific number of users. However, since not including the information of the registering users in the messages would deprive the users of means for receiving reaction from users who received the messages, even healthy communications would be impaired. For this reason, user-participatory position information service requires balanced anonymity means between users' privacy and communications.

A conceivable method for solving the above-mentioned problems is to lay a platform on the presence service that is becoming widespread among users. In instant messaging that is the most popular as service using presence information, since personal information of communication parties such as address information is mutually transferred through presentities, there is a problem in terms of the prevention of leaks of personal information. Also, forcing specific modifications from a presence server and its clients to achieve push-type information delivery service based on the presence service undesirably hampers widespread use of the information delivery service. Since making specific modifications to the presence server reduces future expansion of the presence service, presence information should be acquired according to a procedure of ordinary presence service.

The present invention has been made in view of the above situation and its object is to provide a push-type information delivery method, an information delivery system, and information delivery apparatuses based on the presence service that is capable of reducing leaks of personal information without changing the configuration of conventional presence servers.

In the present invention, presentities indicating channels for performing information delivery are formed on presence service, and virtual channel communication terminals corresponding to the presentities are logically formed on an information delivery server. A channel search server aids users in searching for presentities indicating channels.

Furthermore, during contents delivery, address information is not transmitted directly to each of the transmission source and destination of the contents, and arrangements are made as if the contents were delivered from the channels. Thereby, the above-mentioned object is achieved.

During contents transmission and reception, the need to exchange address information among users is eliminated, making it possible to prevent leaks of personal information.

BRIEF DESCRIPTION OF THE DRAWINGS

FIG. 6 is a drawing showing an example of a channel information table;

FIG. 7 is a drawing showing an example of a user information table;

FIG. 8 is a drawing showing an example of a delivery contents table;

FIG. 9 is a drawing showing an example of a transfer contents table;

FIG. 16 is a drawing showing a display screen displayed in a user communication terminal of a source user when transfer contents are transmitted to a user-desired channel;

FIG. 17 is a drawing showing a display screen displayed in a user communication terminal of a destination user when contents shown in FIG. 16 are transferred;

FIG. 20 is a drawing showing an example of a search index table;

FIG. 21 is a drawing showing an example of a search contents table;

DETAILED DESCRIPTION OF THE PREFERRED EMBODIMENTS

First Embodiment

Hereinafter, preferred embodiments of the present invention will be described with reference to the accompanying drawings.

Figure 1:
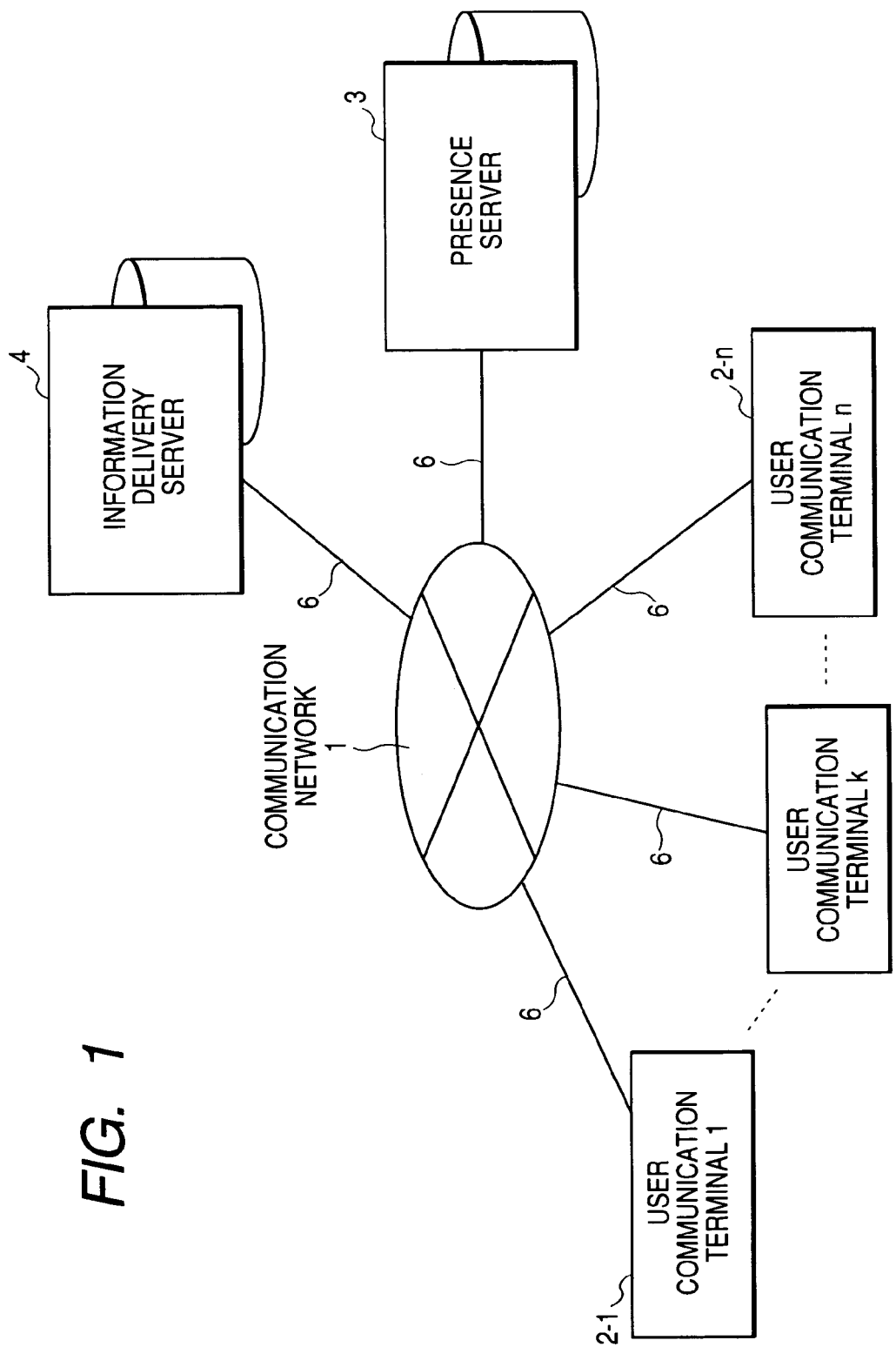
FIG. 1 is a drawing showing a physical configuration of a network assumed in a first embodiment.

FIG. 1 schematically shows a configuration of a physical communication network assumed in a first embodiment. Plural user communication terminals 2-1 to 2-n are connected with each other through a communication network 1. This embodiment assumes that n (natural number) terminals exist. k, which is a natural number from 1 to n, is conveniently shown to indicate any terminal among plural terminals. The user communication terminals may be not only mobile terminals such as cellular phones and PDA but also stationary terminals such as personal computers (PC) having communication functions. The reference numeral 3 designates a presence server which manages attribute information of the user communication terminals 2-1 to 2-n. The reference numeral 4 designates an information delivery server for delivering information (contents) requested by the user communication terminals 2-1 to 2-n. The terminals 2-1 to 2-n, the presence server 3, and the information delivery server 4 are connected with each other through a physical communication line 6.

To enjoy service using presence information, a user has an account, that is, a presentity on presence service provided by a service provider. Information about the presentity is stored and managed in the presence server 3. Here, the service provider is a service providing agency that provides service using presence information, and denotes an agency owning the information delivery server 4 in FIG. 1. The service provider, in some cases, owns only the information delivery server 4, or in other cases, owns both the presence server 3 and the information delivery server 4.

Figure 2:
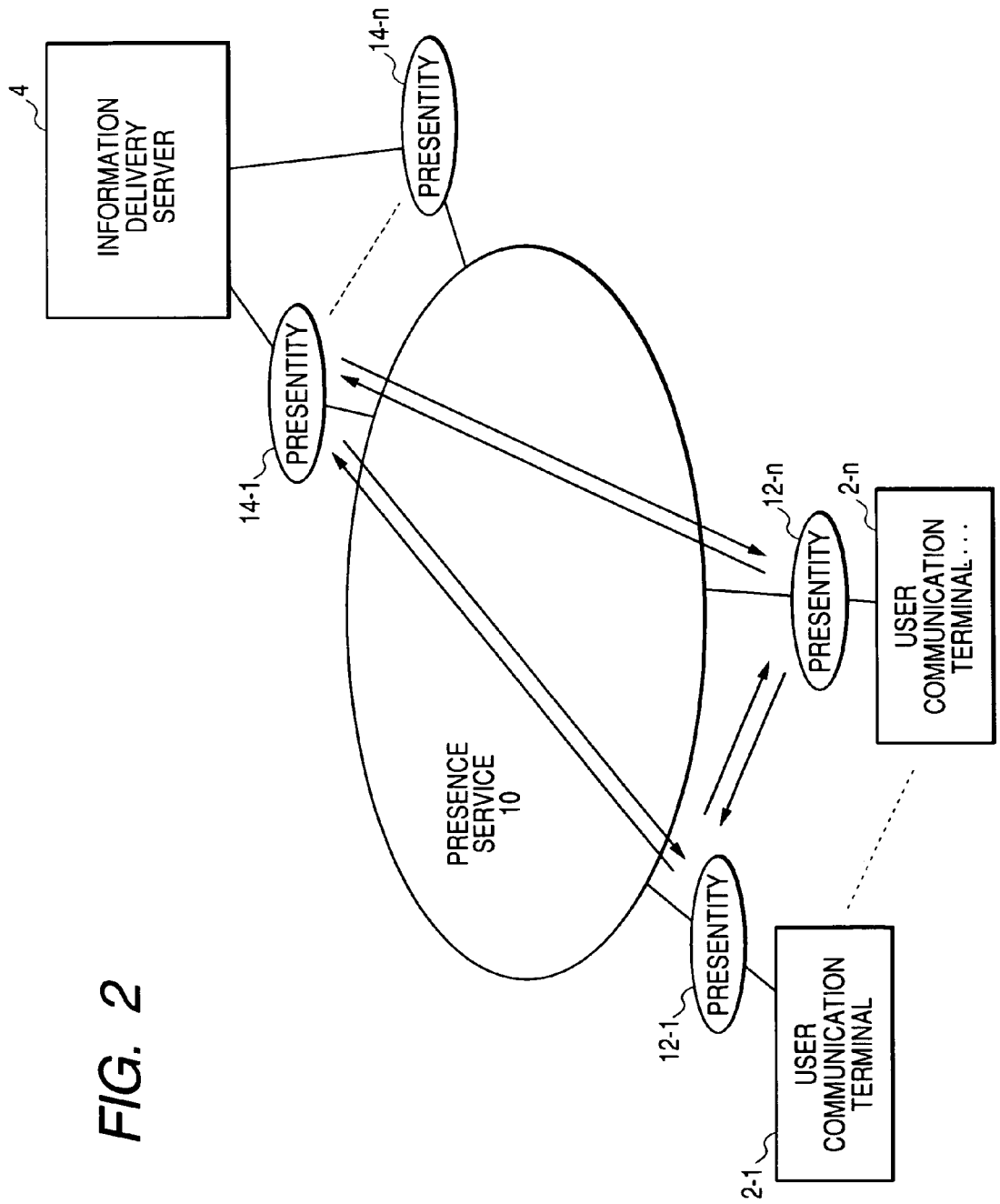
FIG. 2 is a conceptual diagram for explaining the concept of presentity.

FIG. 2 is a conceptual diagram for explaining the concept of presentity of this embodiment. The user communication terminals 2 are connected to presence service 10 through presentities corresponding to clients. Information transmitted and received between the information delivery server 4 and the user communication terminals 2, or among the user communication terminals 2-1 to 2-n are all logically transmitted and received through the presentities. The arrows in FIG. 2 show contents transmission and reception through presentities opened on the presence service 10. The presence service 10 denotes an expanse (hereafter referred to as a domain) on a network managed by the presence server 3, and forms a platform on which service using presence information is provided. Since only one presence server 3 is shown in FIG. 1, the presence service 10 shown in FIG. 2 corresponds to a domain managed by only the presence server 3. However, in a network in which plural presence servers are provided, the size of presence service corresponds to the expanse of an area managed by plural presence servers.

When a user to receive the service using presence information (hereinafter referred to as presence service) holds a contract with a service provider, client software for using the presence service is installed in a terminal the user uses. The software may be installed by downloading through a network or from a portable medium such as CD-ROM. The client software, if provided initially in the user communication terminal, may be used. Thereby, a client (hereinafter referred to as a presence client) to use the presence service operates on the user terminal. The service provider stores account information corresponding to each client on the presence server 3, and establishes an account for providing the presence service. As a result, a presentity corresponding to each client is logically formed in the presence service 10. The account information is information necessary to establish an account, such as, e.g., presentity identifiers of user and channel. In the description below, a character string of the same form as a mail address will be used as a presentity identifier.

FIG. 2 shows presentities 12-1 to 12-n for the user communication terminals and presentities 14-1 to 14-m for the information delivery server which are formed on the presence service 10. In FIG. 2, the number of user communication terminals to receive the presence service is n, the number of clients operating on the n user communication terminals is also n. Therefore, the number of presentities formed on the presence service 10 is also n. Although one presentity is opened to each client in the example of FIG. 2, one client may open plural presentities. Conversely, plural clients may be opened as one presentity.

The information delivery server 4 manages plural channels, which are virtual entities for distributing contents. One presentity 14 is opened for each channel on the presence service 10. When the presentities 14-1 to 14-m for the information delivery server 4 have been formed, though not shown, as many channel communication terminals as channels are virtually formed within the information delivery server. The channel communication terminals will be described later.

On the presence service 10, information transmission and reception between the information delivery server 4 and the user communication terminals 2 or among the user communication terminals 2-1 to 2-n is all performed through presentities. In FIG. 2, the arrows connecting between the presentities 12-1 and 14-1 indicate that presence information flows bi-directionally through the presentity.

Although the presentities 12, 14, and 15 are different from each other in purpose of their use, without differences among them being recognized from the presence service, they are treated as presentities of normal users. However, presence information indicating the type of presentity may be newly added to explicitly indicate whether the presentity indicates a user, channel (information delivery server), or channel search server. The user communication terminals 2 or the presence server 3 includes a buddy list. The buddy list is a list for registering and managing the presentities of communication destinations.

Figure 3:
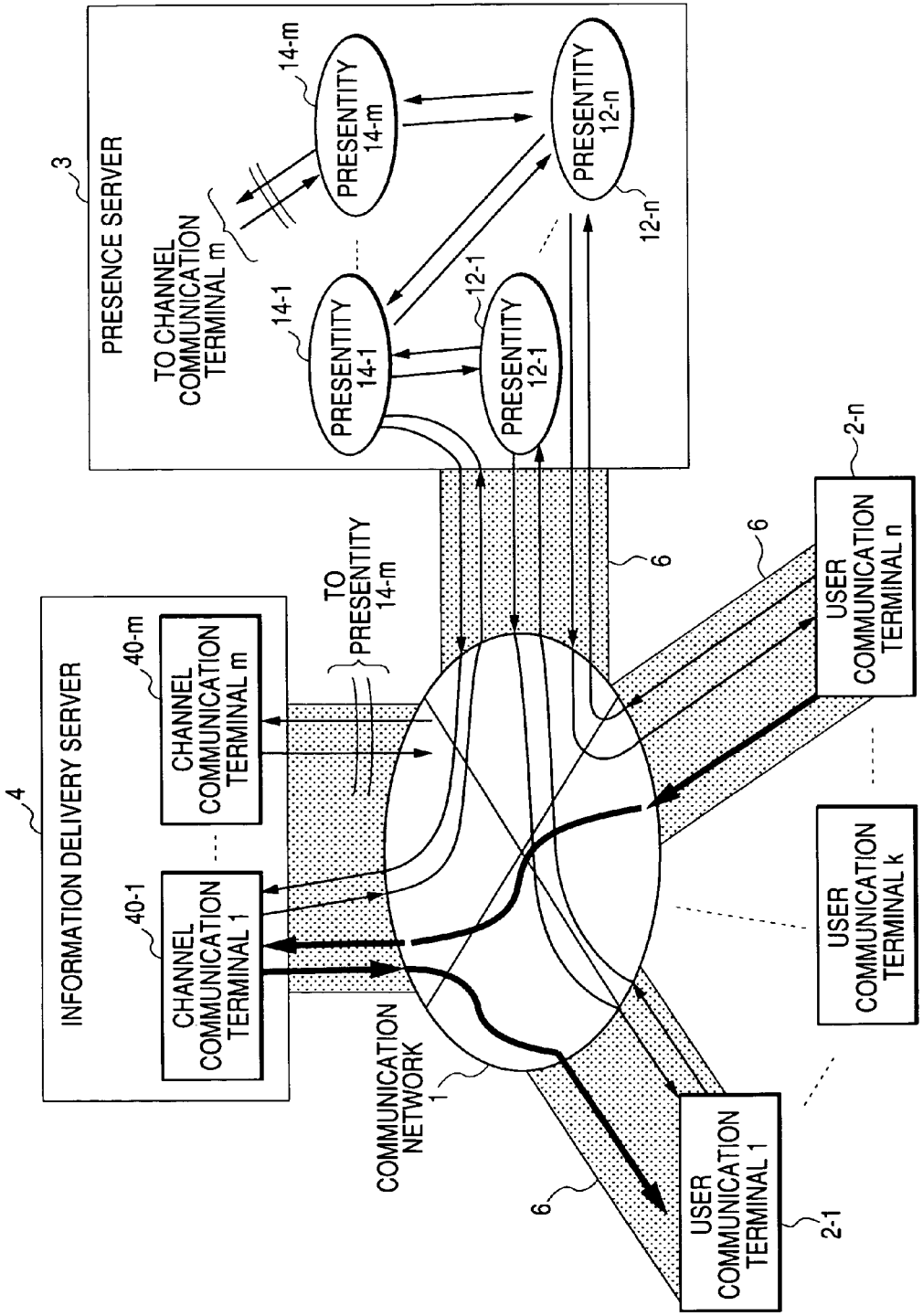
FIG. 3 is a drawing showing how presence information and real contents information transmitted and received among presentities flow on an actual network.

FIG. 3 schematically shows how information flowing among the presentities shown in FIG. 2 flows on an actual physical network. The user communication terminals 2-1 to 2-n, the presence server 3, and the information delivery server 4 are connected to the communication network 1 through the communication line 6 having a prescribed band. In the presence server 3, the presentities 12 (12-1 to 12-n) for the plural user communication terminals are formed to transmit and receive presence information between the user communication terminal 2 and the presence server. Similarly, the presentities 14 (14-1 to 14-m) for the plural information delivery servers are also formed. Furthermore, in the information delivery server, channel communication terminals 40 (40-1 to 40-m) are formed. When presence information is transmitted or received between the information delivery server and the presence server, the information is transmitted or received between the presentities 14 (14-1 to 14-m) for the information delivery server and the channel communication terminals 40 (40-1 to 40-m).

In FIG. 3, thin solid lines indicate the flow of presence information. On the other hand, thick solid lines indicate the flow of contents delivery. This is because, in this embodiment, since the presence server does not store actual contents, actual contents are delivered by the information delivery server 4, in accordance with change in the presence information of the user communication terminals or a contents delivery request from the user communication terminals.

Figure 4:
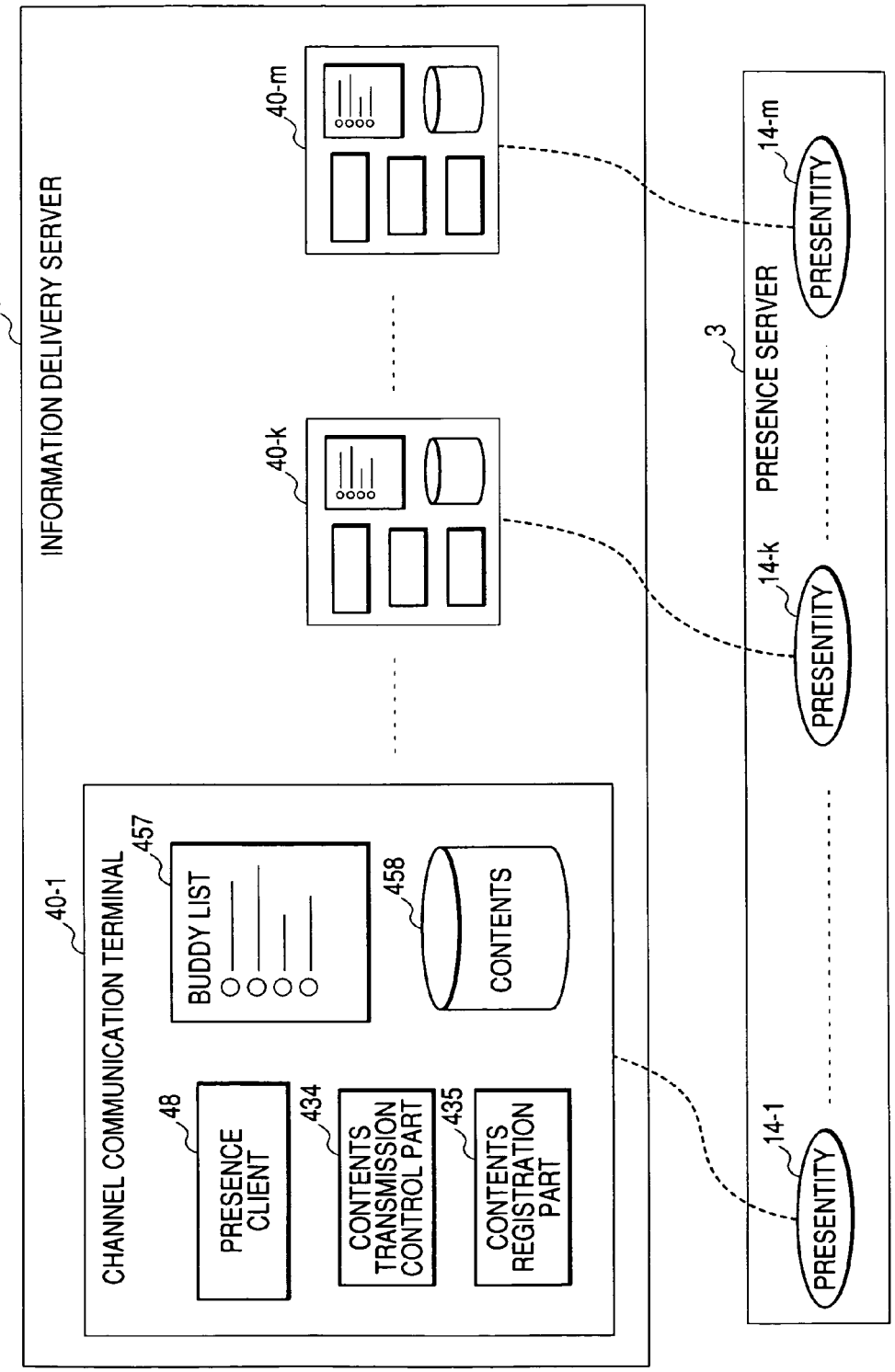
FIG. 4 is a conceptual diagram showing a logical configuration of an information delivery server of a first embodiment.

FIG. 4 shows an internal logical configuration of the information delivery server 4 shown in FIG. 3. For simplicity, in the drawing, the correspondence between the channel communication terminals 40-1 to 40-m and the presentities 14-1 to 14-m for the information delivery server are also shown. In the information delivery server 4, the channel communication terminals 40 corresponding to the presentities 14 are virtually formed. To put it simply, the channel communication terminal 40 is a mini delivery server logically formed in accordance with the channels or the presentities for the information delivery server. The dotted lines indicate the correspondence between the channel communication terminals and the presentity. The channel communication terminals 40-1 to 40-m, like the user communication terminals 2, include a presence client 48 and a buddy list 457. Additionally, it includes: a contents database 458 that stores contents delivered to users; a contents transmission control part 434 that judges transmission of contents, based on users' presence information; and a contents registration part 435 that registers contents in the contents database 458.

Figure 5:
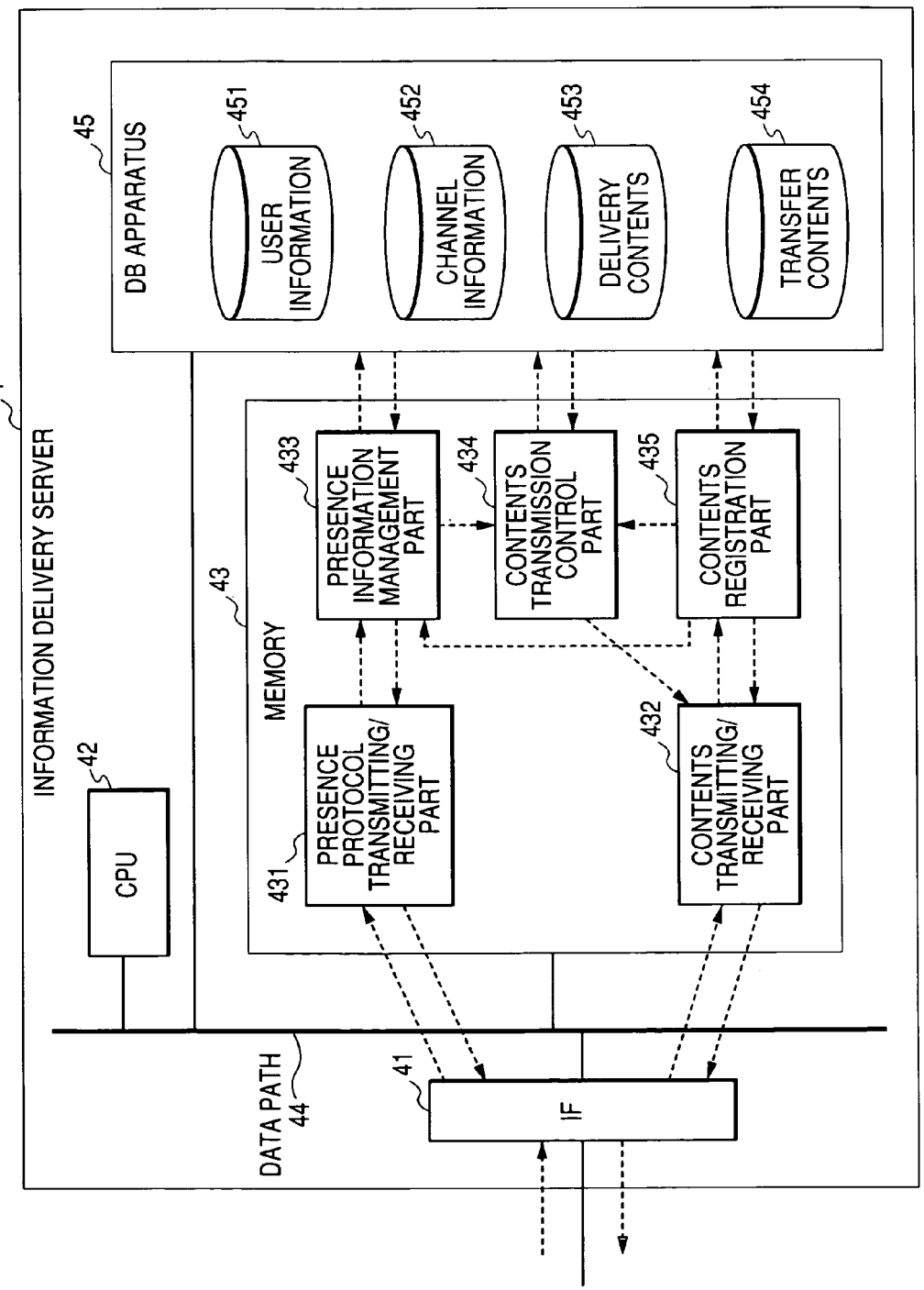
FIG. 5 is a functional block diagram of an information delivery server of a first embodiment.

FIG. 5 is a block diagram showing functional expansion of the internal configuration of the information delivery server 4. In the drawing, the solid lines indicate physical connections of hardware, and the dotted lines with an arrow indicate a logical flow of information. The operation procedures of individual blocks of the information delivery server 4 are stored in the memory 43. During operation, the CPU 42 reads out and executes the operation procedures. Information managed by the information delivery server 4 is stored in a DB apparatus 45 achieved by a storage system such as hard disk, from which required information is retrieved and written to the memory 43.

The memory 43 stores the following functional blocks: a presence protocol transmitting/receiving part 431; a contents transmitting/receiving part 432; a presence information management part 433; a contents transmission control part 434; and a contents registration part 435. The DB apparatus 45 includes: a user information table 451 that stores information about users related to individual channels (hereinafter referred to as user information); a channel information table 452 that stores information about individual channels (hereinafter referred to as channel information); a delivery contents table 453 that stores contents (hereinafter referred to as delivery contents) to be delivered to an unspecific number of users; and a transfer contents table 454 that stores contents (hereinafter referred to as transfer contents) to be transmitted only once from specific users to specific users.

FIG. 6 is a drawing showing an example of the channel information table 452. The information table shown in FIG. 6 comprises a channel No. field, a presentity identifier field (of channel), a channel name field, an introduction phrase field, and the like. Each channel is provided with a presentity identifier serving as an identifier for indicating a corresponding presentity. A channel number, which is an ID allocated uniquely to each channel, is an ID optionally usable according to the design of the information delivery server. In this embodiment, a channel number is used in place of a channel identifier of channel to identify the contents of the user information table, the delivery contents table, and the transfer contents table by channel.

The channel name field stores the name of a corresponding channel. The introduction phrase field stores contents indicating what information a corresponding channel contains. In principle, since channels can be identified by a channel identifier field only, the channel name field is unnecessary. However, since it is difficult for human to understand a channel identifier given to a channel such as cake@example.co.jp, the channel name field is provided taking user's convenience into account. Information (text data or image data) contained in the channel name field and the introduction phrase field is used when a user of the presence service searches for a channel.

FIG. 7 shows an example of the user information table 451. The user information table 451 of this embodiment comprises: a channel No. field; a presentity identifier field (of user); a nickname field; an authority field; a status field; a delivery contents No. field; and a delivery time field. Information stored in the channel No. field and the presentity identifier field is omitted because it has been described in FIG. 6. The nickname field stores a nickname (kind of handle name) a user of the presence service uses on the presence service 10. The authority field stores an identifier indicating whether a user identified by a presentity identifier is an administrator of a corresponding channel or not. The status field stores an identifier indicating a current status of the user such as, e.g., whether the user is currently being connected to the network. In FIG. 7, the status field stores an identifier indicating whether the user is present or not.

Data stored in the presentity identifier field (of user), the nickname field, and the status field is registered or updated by caching part or all of presence information notified from user's presentity. The delivery contents No. field and the delivery time field respectively store a contents number already delivered and time when contents were transmitted just previously. Information stored in the delivery contents No. field is updated by the CPU 42. Similarly, information stored in the delivery time field is recorded and updated by the CPU 42 based on information such as internal clock information of the CPU 42 and information of a timer and the like not shown in the drawing. The delivery contents No. field and the delivery time field, which are unnecessary in principle, are required to control contents delivery conditions in more detail.

The contents delivery conditions specify, for example, that contents are delivered when user's presence information matches a specific time, or contents delivered once will not be delivered again. Therefore, if required to decide contents delivery conditions, fields other than the contents No. field and the delivery time field may be included in the user information table 451. The user information table 451 may be split to plural sub-tables in accordance with the value of channel number. Splitting to sub-tables provides the advantage that user-opened presence information for each channel can be differentiated among (see Bob's status in the drawing).

FIG. 8 shows an example of the delivery contents table. The table shown in FIG. 8 broadly comprises: a Delivery contents No. field; a channel No. field; a field concerning delivery conditions for user's presence information; a field in which contents transmitted are stored when delivery conditions are satisfied; and a field in which information about limitations on contents delivery (delivery count, validity term, etc.) is stored. The delivery contents No. field stores a unique ID for delivery contents. The delivery condition field stores delivery conditions when the contents are transmitted to a user. The contents type field stores a type identifier indicating the type of stored contents. Although only data of text type is stored in an example of FIG. 8, image data and sound data may be stored.

The contents type field stores an identifier indicating an image format when contents are image data, and an identifier indicating audio codec when contents are audio data. Data stored in the contents type field, when contents are delivered, are included in a packet for delivering the contents and transmitted to a user, whereby the client operating on the user communication terminal can select application software necessary to display the transmitted contents. The contents field stores contents data delivered. The delivery count field stores the number of deliveries to a user of the contents. For example, the number of deliveries of contents corresponding to delivery contents No. 1 is one, while the number of deliveries of contents corresponding to delivery contents No. 145 is unlimited.

The validity term field stores the validity term of contents delivery. The data stored in the delivery condition field, the delivery count field, or the validity term field is set by a user. The delivery count field and the validity term field, which are unnecessary in principle, are required to control contents delivery conditions in more detail. Therefore, if required to decide contents delivery conditions, fields other than the delivery count field and the validity term field may be included in the contents delivery table 453. By splitting the table of FIG. 8 to plural sub-tables by the value of channel number, the CPU 42 advantageously searches the delivery contents table at an improved search speed.

FIG. 9 shows an example of the transfer contents table. The transfer contents table of this embodiment comprises: a channel No. field; a source presentity field in which a presentity identifier of a source user is stored; a destination presentity field in which a presentity identifier of a destination user is stored; a contents type field in which a type identifier indicating the type of contents transferred is stored; and a transfer contents field in which the real data of contents actually transferred is stored. The transfer contents field stores transfer contents that could not be transferred immediately because a destination user was absence. Although omitted in FIG. 9, delivery conditions for user's presence information may be included in a column of the transfer contents table as well. In this case, if presence information of a destination user satisfies delivery conditions of transfer contents, the contents are immediately transferred, and if the delivery conditions are not satisfied, the contents are stored in the transfer contents table.

Basic Operation During Contents Delivery

Hereinafter, using a sequence diagram shown in FIG. 10, and FIGS. 4 to 9, a description will be made of how the information delivery server 4 operates during contents delivery. In the description below, the presentity identifier of a user who desires contents delivery is charlie@example.co.jp, a nickname of the user is "Charlie", and the presentity identifier of a channel desired by the user is cake@example.co.jp, and a channel name is "cake from sky".

Figure 10:
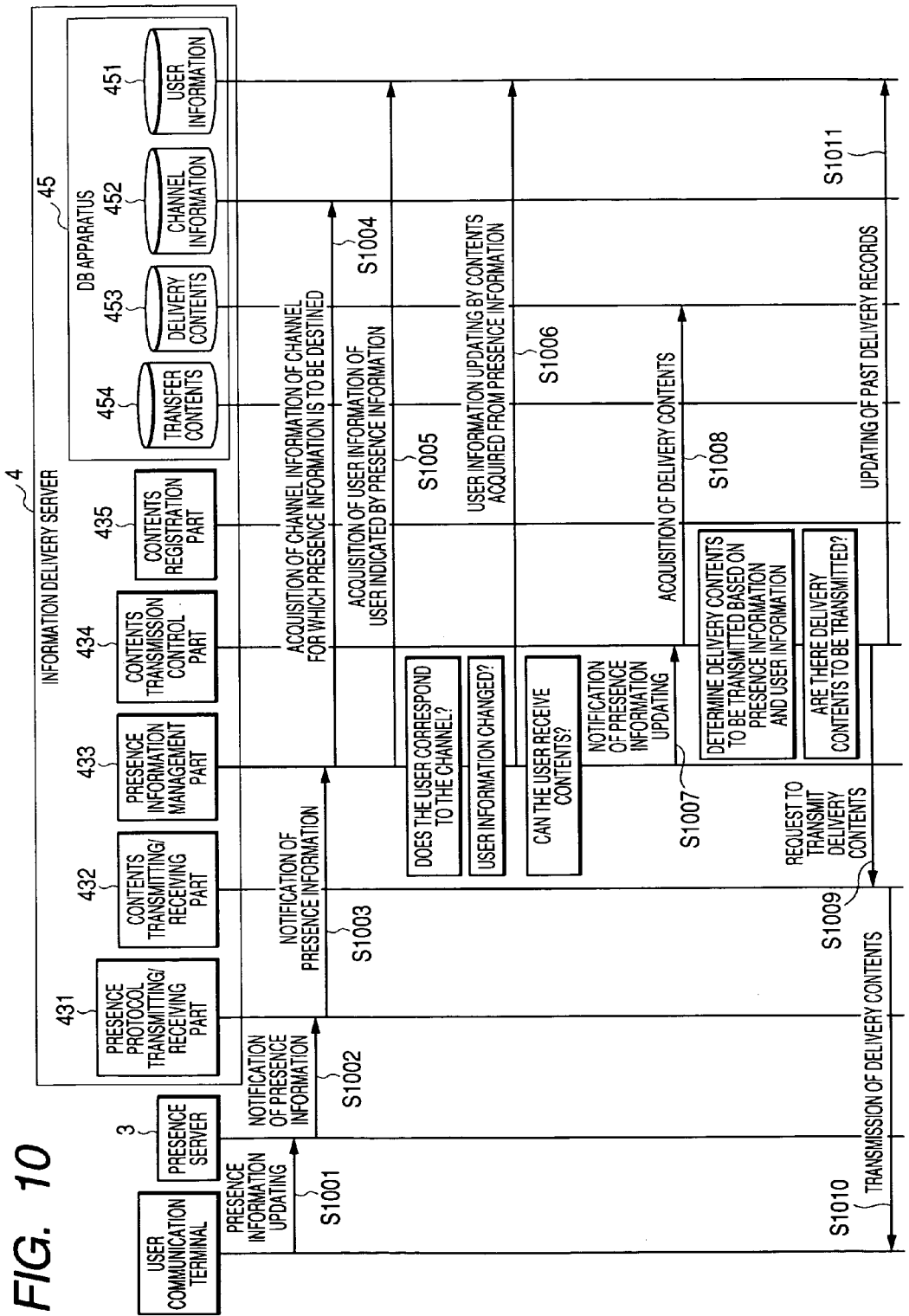
FIG. 10 is a drawing showing operation sequences during delivery contents transmission.

FIG. 10 is a sequence diagram showing an example of the operations of the information delivery server 4 when delivering contents to a user. There are two types of contents: delivery contents and transfer contents. In FIG. 10, a flow of delivering delivery contents is described. Upon notification of user's presence information to a specific channel, the information delivery server 4 searches the DB apparatus 45 for delivery contents whose delivery conditions match the user's presence information, of contents belonging to the channel, and transfer contents transferable to the user. The contents judged as transmittable are transmitted to the user.

If presence information of a user communication terminal changes, the presence information is transmitted from the user communication terminal to the presence server 3 (S1001). Presence clients, including the information delivery server 4, receive notification of user's presence information by filing push-type notification of presence information of a specific user with the presence server 3, or periodically requesting presence information from the presence server. The former is referred to as a subscribe method and the latter as a fetch method. In the subscribe method, no notification is made unless user's presence information is changed, while, in the fetch method, notification is made even if presence information is not changed. Although general presence clients primarily uses the subscribe method, the information delivery server 4 may use both the subscribe method and the fetch method. For example, in the case where the presence information management part 433 is triggered by S1406 of FIG. 14 to acquire presence information, the fetch method is preferable to immediately judge contents delivery.

When the information delivery server 4 receives a notification packet of presence information (S1002), the packet is analyzed with the IF 41 of FIG. 5, and presence information stored in the header part or payload part is extracted. In the description below, operations such as "notification" and "request" are all transmitted and received in the form of a packet or message corresponding to a communication protocol used. In this embodiment, user's presence information including user's presentity identifier "charlie@example.co.jp", user's nickname "Charlie", status information "present", and user's position information is notified to a channel of presentity identifier "cake@example.co.jp". The notification is sent to the presence protocol transmitting/receiving part 431 through the IF 41. The presence protocol transmitting/receiving part 431 transfers it to the presence information management part 433 (S1003). This notification may be received by either the subscribe method or the fetch method.

The presence information management part 433 refers to the channel information table 452 and uses the presentity identifier of a channel requested to subscribe to from the user as a key to acquire the channel number of the channel (S1004). The presence information management part 433 further refers to the user information table 451 to acquire information about the user making the subscribe request against the channel such as presence information (user's presentity identifier charlie@example.co.jp, authority information: General, and status information: Present), information about contents numbers already delivered, and information about previous delivery time (S1005). In step 1406 and other steps described later, the system may be configured to fetch user's presence information from the presence server 3 each time. However, in the fetch method, since the presence server 3 requires a lot of time to create a notification packet, response of the entire system to the user communication terminal becomes slow.

Accordingly, in this embodiment a part of user's presence information is cached to the user information table 451. In step 1005, the presence information management part 433 determines whether the user making the contents delivery request corresponds to the channel. Specifically, if user information corresponding to the presence information notified from the presence server 3 exists in the user information table 451, the processing is continued; if it does not exist, the processing is terminated, regarding the user as not yet making a subscription to the channel.

Next, the presence information management part 433 determines whether the presence information notified from the presence server 3 has changed in comparison with the presence information cached to the user information table 451. If the user information has changed, the user information table 451 is updated with new contents (S1006). Finally, the presence information management part 433 determines whether a status included in the user information indicates a contents receivable state such as "presence", and if the user is contents-receivable, notifies the contents transmission control part 434 of the updating of the presence information and its contents (S1007). In this embodiment, since Charlie's status information is "present", the presence information management part 433 determines that the user can receive contents, and executes the operation of step 1007. If a change of presence information is received for a contents-unreceivable user, for example, if a change of presence information on Bob of FIG. 7 is received, the presence information management part 433 determines that the user cannot receive contents, and terminates the processing.

Upon receipt of the presence information in step 1007, the contents transmission control part 434 refers to the delivery contents table 453, and acquires delivery contents corresponding to a destination channel and reference information for determining whether contents should be delivered (S1008). In step 1008 of this embodiment, for example, contents "Recommendable items of cake shop A . . . " and "Term limited . . . " corresponding to channel number 1, whose delivery is requested from user 1, are acquired by the contents transmission control part 434. After termination of step 1008, the contents transmission control part 434 selects the contents to be delivered, based on the user's presence information and past delivery records included in the user information. As delivery conditions stored in the delivery contents table 453, a function for judging contents delivery may be used. By passing user's presence information and the like to the stored function as arguments, deliverable contents are identified.

Contents whose delivery count is one and which has already been delivered to the user (contained in past delivery records) are excluded from the above identification. Based on the above processing, the contents transmission control part 434 can determine whether delivery contents to be transmitted to the user exist. In this embodiment, comparison is made using information stored in a delivery count field and a validity term field corresponding to the contents "Recommendable items of cake shop A . . . " and "Term limited . . . " acquired from the delivery contents table, and information stored in a contents No. field and a past delivery time field corresponding to "Charlie" of FIG. 7. As a result, the contents "Recommendable items of cake shop A" not delivered previously are selected. If contents to be delivered exist, the contents transmission control part 434 transfers all or part of the contents to the contents transmitting/receiving part 432 (S1009).

The contents transmitting/receiving part 432 transmits the transferred contents to the user communication terminal 2 through the IF 41 (S1010). After the termination of the transmission, based on the result, the past delivery record field of the user information table 451 is updated (S1011).

Next, using a sequence diagram shown in FIG. 11 and FIGS. 4 to 9, a description will be made of how the information delivery server 4 operates when transmitting transfer contents. In this embodiment, it is assumed that contents transmitted from a source user corresponding to a presentity identifier "bob@example.co.jp" shown in the transfer contents table of FIG. 9 to a destination user corresponding to a presentity identifier "alice@example.co.jp" couldn't be delivered in real time because the destination user was absent, and the contents was stored in the transfer contents table.

Presence information of a destination user "Alice" has changed from "absent" to "present", and the change is notified from the user communication terminal to the presence server 3 (S1101). In this embodiment, user's presence information including user's presentity identifier "alice@example.co.jp", user's nickname "Alice", status information "present", and user's position information is notified to a channel of presentity identifier "cake@example.co.jp". The operations from step 1102 to step 1107 are omitted because they are the same as those from steps 1002 to 1007 described in FIG. 10. Operations in and after step 1108 will be described below.

Since it is determined that contents can be delivered to "Alice" who has been notified of change in presence information, the contents transmission control part 434 refers to the transfer contents table 454, and acquires transfer contents that correspond to a destination channel of the presence information and of which source user of the presence information is a destination user (S1108). Since it has been recognized that the presentity identifier of user "Alice" notified from the presence server 3 is alice@example.co.jp as a result of the operations from steps 1103 to 1107, the contents transmission control part 434 can acquire transfer contents "The indicated new product . . . " of which a source user of the presence information is a destination user, from the transfer contents table of FIG. 9. If relevant contents do not exist in the transfer contents table, the contents transmission control part 434 terminates the contents transfer processing. In this embodiment, since transfer contents exist, all or part of them are transferred to the contents transmitting/receiving part 432 (S1109). The contents transmitting/receiving part 432 transmits the transfer contents to the user through the IF 41 (S1110). It deletes the transfer contents having been transmitted from the transfer contents table 454 (S1111).

Figure 11:
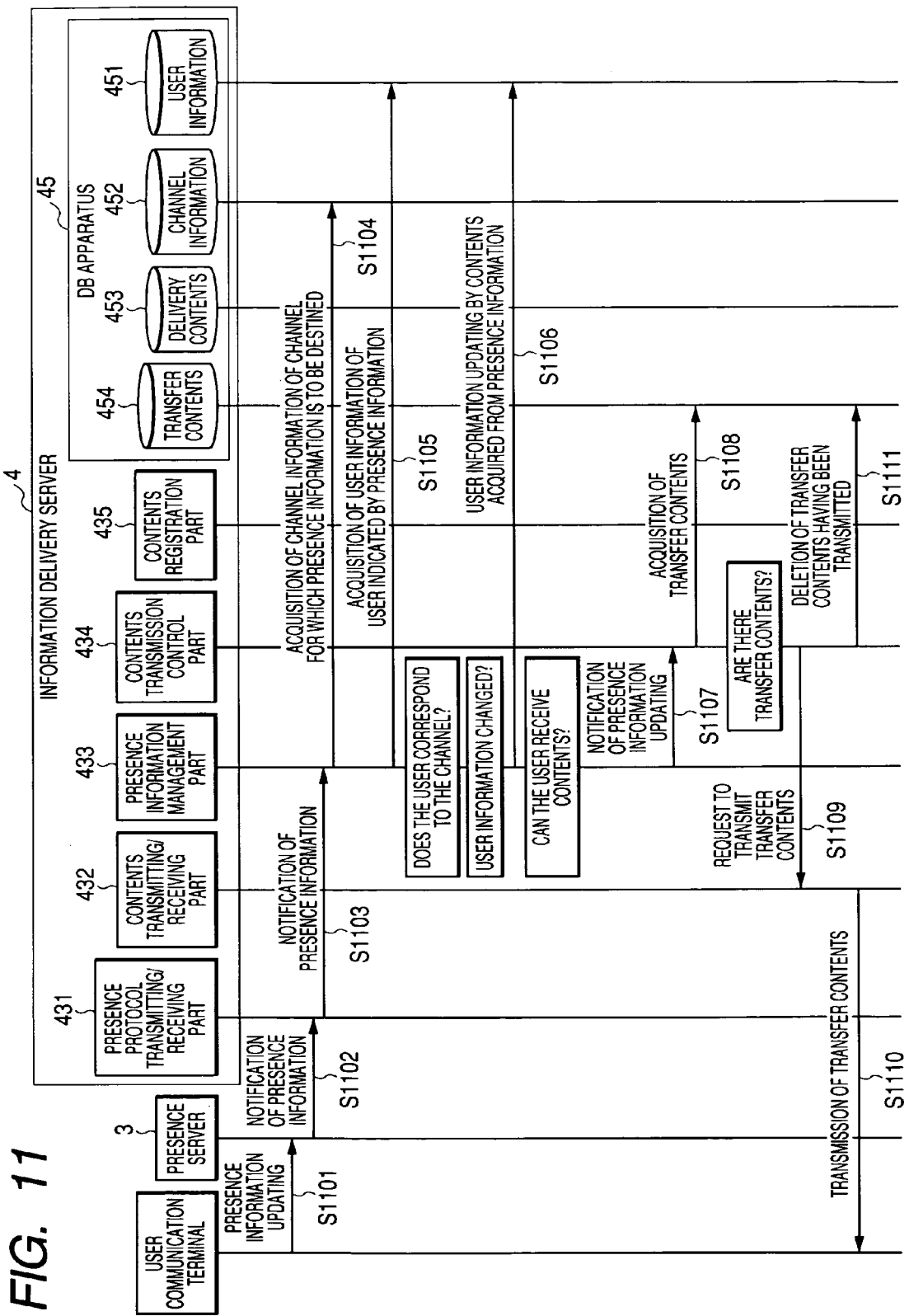
FIG. 11 is a drawing showing operation sequences during transfer contents transmission.

Actually, for users who have been notified of change in presence information from the presence server, transmission of delivery contents and transmission of transfer contents are performed in parallel. Specifically, processing in and after step 1008 of FIG. 10, and processing in and after step 1108 of FIG. 11 are performed concurrently. However, for simplicity, in the above description, transmission of delivery contents and transmission of transfer contents are described using different drawings.

Configuring the system as described above enables push-type contents delivery upon change of user's presence information.

Subscribing to Channel

The above description has been made of a method of contents delivery and transfer to users who have already made registration to channels. Users who desire contents delivery from new channels must make registration to the channels. A method of channel registration by users is described below. In the description below, a presentity identifier of the user is bob@example.co.jp, the nickname of the user is "Bob", the presentity identifier of a channel to which the user desires to subscribe is cake@example.co.jp, and a channel name is "cake from sky".

When subscribing to a specific channel, the user operates a terminal to add the presentity 14 of the channel to a buddy list. Since the contents of the buddy list have changed, the user communication terminal transmits a change in the contents of the buddy list to the presence server 3. Practicably, sequences are formed so that client software installed in the user communication terminal detects the change in the buddy list, and communication application software provided in the terminal is activated to automatically transmit the change.

Figure 12:
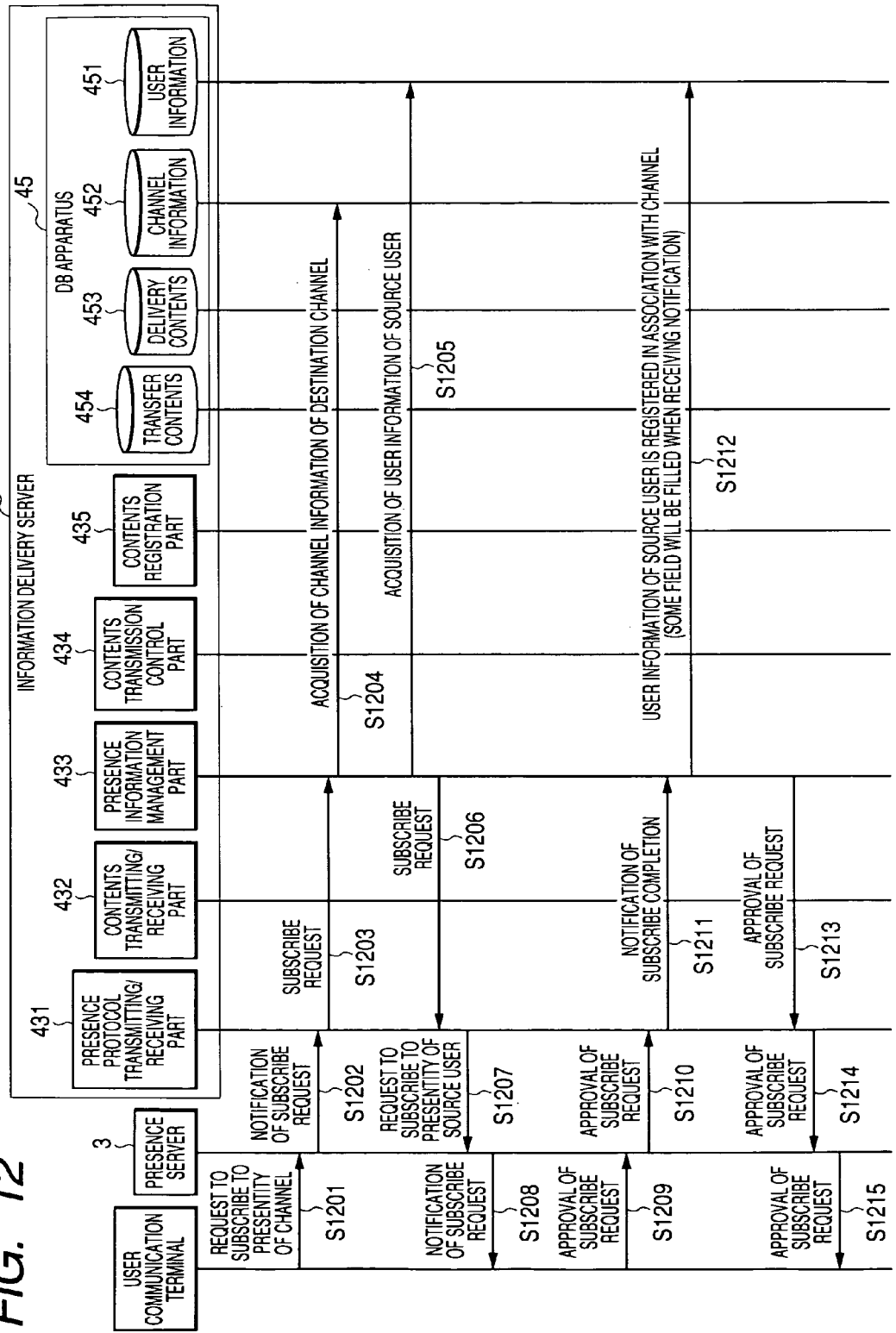
FIG. 12 is a drawing showing operation sequences when a user subscribes to a channel.

FIG. 12 is a sequence diagram showing an example of the operations of the information delivery server 4 when a subscription to the channel is filed from the user. When the presentity 14 of a channel has been added to a buddy list owned by the user communication terminal 2, it issues a request to subscribe to the presentity 14 of the channel to the presence server 3 (S1201). During the subscription, a packet in which at least the presentity identifier "cake@example.co.jp" of a channel to subscribe to and the user's presentity identifier "bob@example.co.jp" are stored is transmitted from the user communication terminal 2 to the presence server 3. Upon receipt of the request, the presence server 3 notifies the information delivery server 4 of the subscribe request from the user, or the presence server 3 issues the subscribe request in place of the user (S1202). This request is sent to the presence protocol transmitting/receiving part 431 through the IF 41 of the information delivery server 4. The presence protocol transmitting/receiving part 431 issues the subscribe request to the presence information management part 433 (S1203).

The presence information management part 433 refers to the channel information table 452 to acquire the channel number of the channel requested to subscribe to from the user (S1204) The presence information management part 433 further refers to the user information table 451 to acquire information about the user making the subscribe request against the channel such as presence information (authority information: Administrator, status information: Present), information about contents numbers already delivered, and information about previous delivery time (S1205). If such user information does not exist, the user is regarded as not yet making a subscription to the channel. If the user does not yet make a subscription to the channel, before subscription from the user is approved, the channel subscribes to the user (if success in the subscription is assured, the subscription may be approved before the channel subscribes to the user).

The presence information management part 433 issues a request to subscribe to the presentity of the user with the presentity of the channel as a transmission source to the presence protocol transmitting/receiving part 431 (S1206). The presence protocol transmitting/receiving part 431 issues a request to subscribe to the presentity 12 of the user to the presence server 3 through the IF 41 (S1207). Upon receipt of this request, the presence server 3, as operation of ordinary presence service, notifies the user communication terminal 2 of the subscribe request from the information delivery server 4 (channel) or issues the subscribe request in place of the information delivery server 4 (S1208).

When the user approves the subscribe request, the fact is notified to the presence server 3 (S1209), which in turn notifies the information delivery server 4 of the fact (S1210) This notification is transferred to the presence protocol transmitting/receiving part 431 through the IF 41 of the information delivery server 4. The presence protocol transmitting/receiving part 431 notifies the presence information management part 433 of the completion of the subscribe (S1211), and the presence information management part 433 adds a line indicating user's information (authority is "General") to the user information table 451 (S1212). Finally, the presence information management part 433 approves a user's subscribe request having been first sent. Subsequent processing is the same as when the user has approved the subscribe request (S1213, S1214, S1215). Thereafter, the channel on the information delivery server 4 acquires user's presence information through the presentity 12, and can transmit and receive contents to and from the user communication terminal 2 through communication means included in presence information.

The above processing is always performed the first time that a user subscribes to a channel. A second time or later, subscribe requests from the user may be immediately approved by the presence server 3, or the presence information management part 433 of the information delivery server.

Registering Delivery Contents

To deliver contents by using a channel on the information delivery server 4, an administrator of the channel (hereinafter referred to a channel administrator) must have transmitted delivery contents and their delivery conditions to the information delivery server 4 by some methods. The methods are broadly divided to two methods.

A first method is to use a function to transmit and receive contents among users, wherein presence clients have the function. Since channel presentities 14 and user presentities 14 are treated equally on presence service, delivery contents can be transmitted to channels (actually the information delivery server) in the form of contents (text, sound, and moving images, etc.) used for communications among users.

Figure 13:
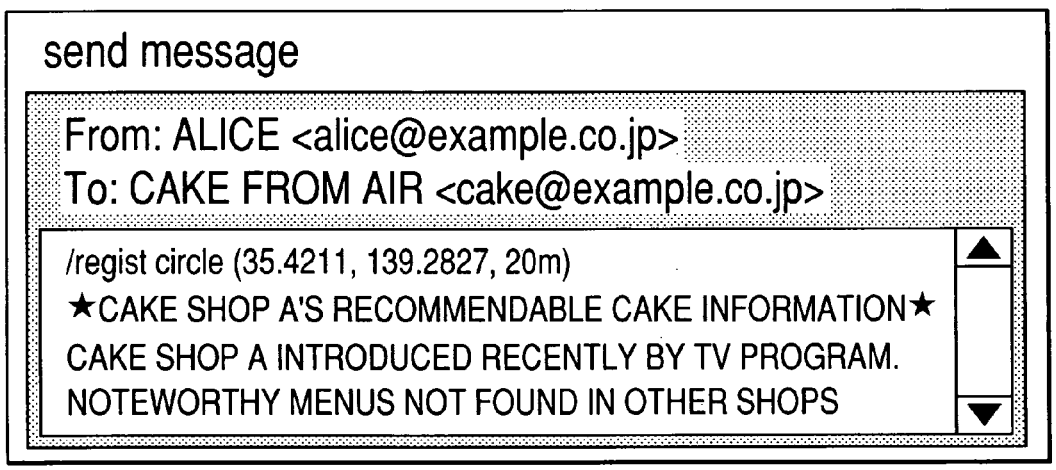
FIG. 13 is a drawing showing a display screen displayed in a user communication terminal when delivery contents are transmitted.

FIG. 13 shows an example of a message transmission window screen of a user communication terminal when delivery contents are transmitted using an instant messenger. This assumes a registration operation screen of delivery contents. The first characters "/regist" of a first line of a message are a command indicating that the message is a registration of delivery contents. The command is followed by characters indicating the delivery condition of "within 20 m from a location of latitude 35.4211 and longitude 139.2827". Text on and after the second line is actual delivery contents. A delivery condition may be specified using presence information of a channel administrator. For example, only "within a radius of 20 m" may be inputted instead of "within 20 m from a location of latitude 35.4211 and longitude 139.2827" by in advance setting "within 20 m from a location of the channel administrator at the time of registration" for input in the form. By this arrangement, the user is relieved of efforts to input deliver conditions.

As a second method, an interface for registering delivery contents is provided on the information delivery server 4, and a client to use the interface is provided in the user communication terminals 2 or other terminals. As an example, the information delivery server 4 opens an interface for registering delivery contents as CGI on Web so that users use it through a Web browser.

Figure 14:
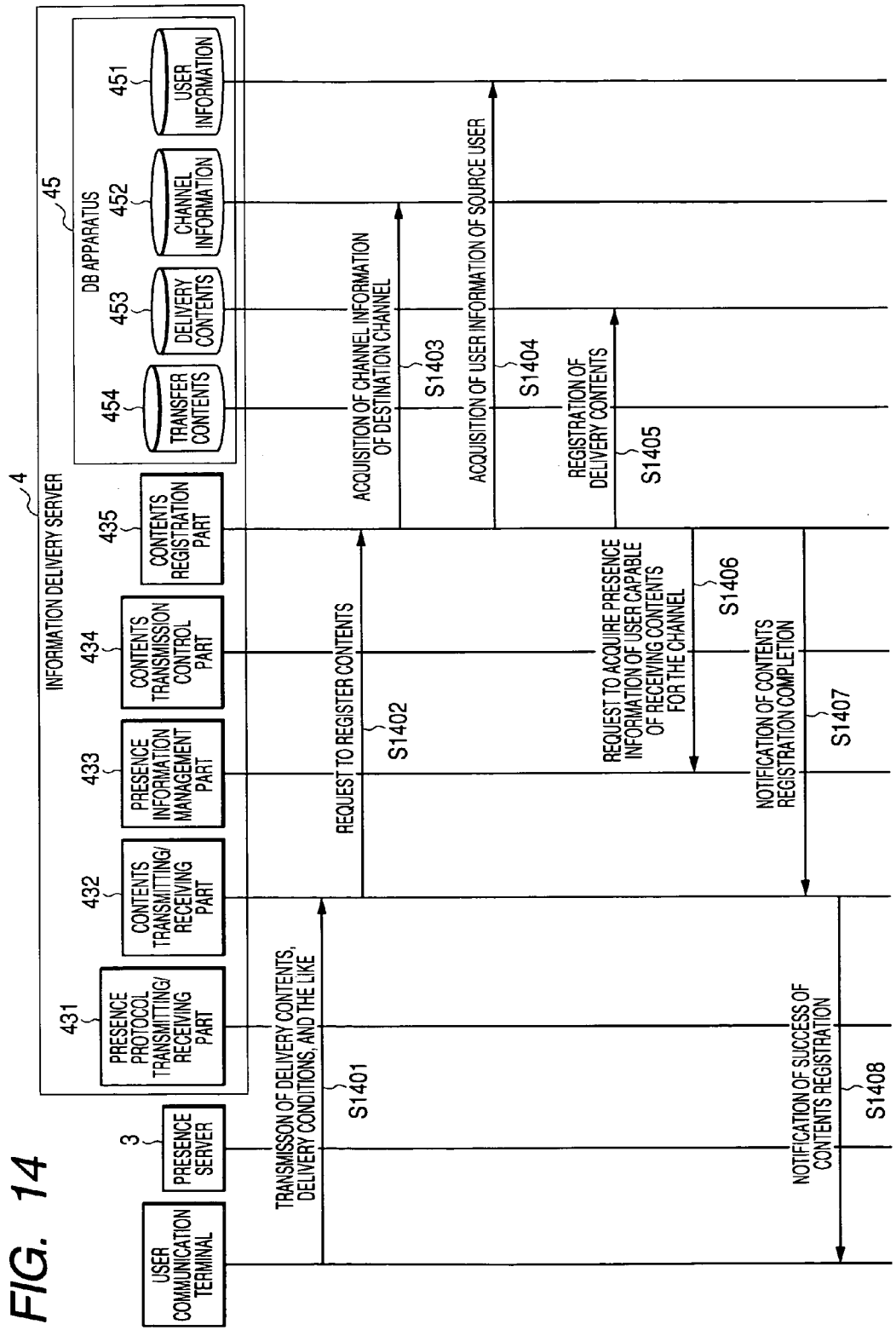
FIG. 14 is an operation sequence diagram when contents are registered.

FIG. 14 is a sequence diagram showing an example of the operations of the information delivery server 4 when delivery contents are registered. In the description below, including this example, delivery contents are registered by the first method described above.

A user communication terminal 2 transmits delivery contents and their delivery conditions to the information delivery server 4 by a contents transmitting/receiving function of a presence client on the terminal (S1401). At this time, contents information, delivery conditions, and limitation information on deliveries shown in FIG. 8, as well as a channel's presentity identifier and a presentity identifier of a user requesting contents registration are transmitted to the information delivery server 4. The transmitted contents are transmitted to the contents transmitting/receiving part 432 through the IF 41 of the information delivery server 4. Upon receiving them, the contents transmitting/receiving part 432 requests the contents registration part 435 to register the contents (S1402).

The contents registration part 435 refers to the channel information table 452 and uses the presentity identifier of a channel as a key to acquire a channel number (S1403). Next, the contents registration part 435 refers to the user information table 451 to acquire user information of a source user, that is, a user's presentity identifier and authority information (S1404). This is done to check authority for the channel of the user from which the contents are to be transmitted. If it is determined that the source user is a channel administrator of the destination channel, the delivery contents are registered in the delivery contents table 453 (S1405).

When delivery contents are to be transmitted to users satisfying delivery conditions without waiting for the notification of presence information from the users, the contents registration part 435 requests the presence information management part 433 to acquire presence information of users subscribing to the channel (S1406). At this time, presence information may be requested only for contents-receivable users with a status of "present" in the user information table 451. If delivery contents have been successfully registered, the channel administrator may be notified of successful registration of delivery contents through the contents transmitting/receiving part 432 and the IF 41 (S1407, S1408).

Figure 15:
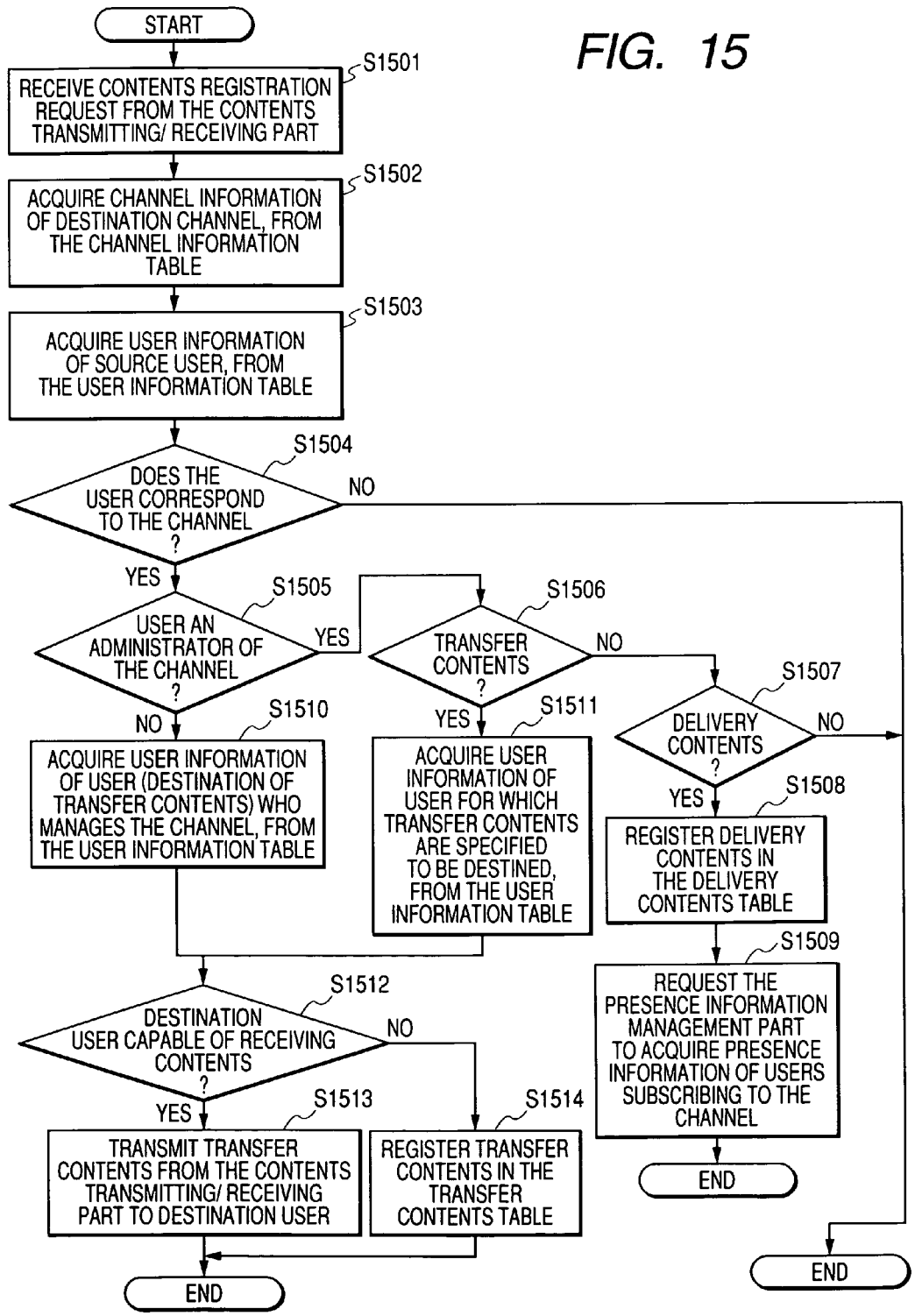
FIG. 15 is a flowchart showing internal operations of an information delivery server when registering contents.

FIG. 15 shows a flowchart on the operations of the information delivery server when registering contents. The flowchart shows the operation in more detail than the sequence diagram of FIG. 14.

Contents transmitted to a channel from a user communication terminal 2 are sent to the contents transmitting/receiving part 432 in the information delivery server 4. The contents transmitting/receiving part 432 transmits the contents to the contents registration part 435 (S1501).

The contents registration part 435 acquires channel information of a channel to which the contents are to be transmitted, from the channel information table 452 (S1502). Next, to check authority for the channel of a user from which the contents are to be transmitted, it acquires user information of the user from the user information table 451 (S1503). If the source user is neither a subscriber of the channel nor a channel administrator, the contents are immediately discarded and the processing is terminated (S1504).

Next, processing is branched depending on whether the source user is a channel administrator of the channel (S1505). If the source user is a channel subscriber, the contents are regarded as transfer contents to the channel administrator. If the source user is a channel administrator, a command on the first line of the message is checked to determine whether the contents are transfer contents or delivery contents (S1506) If the contents are neither transfer contents nor delivery contents because the command on the first line of the message is invalid, the contents are discarded and the processing is terminated (S1506).

If the source user is a channel administrator and the contents are delivery contents, the delivery contents are stored in the delivery contents table (S1508). When delivery contents are to be transmitted to users satisfying delivery conditions without waiting for the updating of presence information from the users, the contents registration part 435 requests the presence information management part 433 to acquire presence information of users subscribing to the channel (S1509). At this time, the presence information management part 433 may request presence information only for contents-receivable users.

If the source user is a channel administrator or a channel subscriber and the contents are transfer contents, user information of respective destinations is acquired from the user information table 451 (S1510 S1511). The status of destination user is checked (S1512), and if the destination user's status is contents-receivable, the contents are transmitted through the contents transmitting/receiving part 432 (S1513). If the destination user's status is not contents-receivable, transfer contents are registered in the transfer contents table 454 (S1514). The contents transmitting/receiving part 432 transmits the transfer contents to the user communication terminal 2 through the IF 41.

Since users can subscribe to and cancel channels through addition and deletion of presentities to a buddy list, advantageously the users can easily subscribe to channels (museum guide channel, etc.) with contents delivery limited to specific locations and time. In contrast to the above example, a procedure for subscribing to a channel may be started by subscribing to a user presentity from a channel presentity.

Newly Preparing a Channel

To deliver contents using the information delivery server 4, a user must issue a request to prepare a channel to an administrator or a management program of the information delivery server 4 (hereinafter referred to as management entity). The management entity is capable of handling the channel information table and the presence information table.

The information delivery server 4 receives a channel preparation request from a user by some means. The means include offline documents, electronic mail, input to Web site forms, instant messages, and the like. The following are included in the channel preparation request: a user's presentity identifier, a first-choice channel presentity identifier, a channel name, an introduction phrase, and the like. In the description below, a user's presentity identifier is alice@example.co.jp, a user's nickname is "Alice", and the presentity identifier of a channel desired by the user is cake@example.co.jp, and a channel name is "cake from sky".

Upon receiving the request, the management entity uses means provided as part of presence service to newly add a presentity identifier "alice@example.co.jp" specified by the user to the presence server. If the presentity identifier has already been used by other users, the addition fails and the presence server 3 notifies the information delivery server 4 of the fact. In this case, information about usable presentity identifiers may be transmitted to the information delivery server 4 so that it is transferred to the user through the information delivery server 4. In this example, it is assumed that the presentity identifier has been added as desired by the user.

Next, channel information is registered in a table within the DB apparatus 45. First, a line indicating information about a new channel is added to the channel information table 452. Next, to register the user having made request as a channel administrator, a line indicating information about the channel administrator (authority is "administrator") is added to the user information table 451.

The second and sixth top lines of the table of FIG. 9 are lines indicating a channel administrator. Although one channel administrator always exists for one channel in FIG. 9, plural channel administrators may be registered for one channel. This terminates the registration of channel information in the DB apparatus 45.

Finally, the management entity of the information delivery server 4 notifies a channel administrator of the presentity identifier of a channel by some means. The means include offline documents, electronic mail, output from Web site, instant messages, and the like.

When notified of the presentity identifier of the channel from the management entity of the information delivery server 4, the channel administrator uses it to subscribe to the presentity indicating the channel and add the channel presentity to the buddy list (this addition will immediately succeed because the presentity identifier of the channel administrator has already been registered in the user information table). On presence service, as described above, channel presentities are treated like other user presentities.

The system configuration described above allows terminal users to freely perform various setting operations on channels.

FIGS. 16 and 17 show examples of terminal screens displayed in a terminal of the channel administrator "Alice" and a terminal of the user "Bob" subscribing to the channel "cake from air" managed by Alice. FIG. 16 shows a screen displaying a message (contents) sent to the channel "cake from air" from Bob, and FIG. 17 shows a screen displaying a message Alice received from the channel "cake from sky". It is understood from FIG. 16 that Bob transmitted the contents not directly to Alice (e.g., to an address of Alice) but to the channel. In the Alice's terminal screen of FIG. 17, only the nickname of the channel subscriber Bob is displayed, and other personal information (address, presentity identifier, etc.) is not displayed at all. Contents transmitted to the channel from users who are neither a channel subscriber nor a channel administrator are ignored by the information delivery server 4. In other words, the system operates like ordinary presence clients which shut out contents from other than presentities registered in a channel buddy list.

As delivery condition, presence information other than position information may be used. For example, current temperature and humidity acquired from various sensors may be handled as presence information. If positions in virtual space of net games or the like, and a logical position such as URL of a site a user is browsing by a Web browser are used as presence information, the effect of enhancing communications between users can be expected as in this embodiment.

Furthermore, dynamically changing information other than presence information of channel subscribers may be included in delivery conditions of delivery contents. An example of this sort of delivery condition is "Deliver delivery contents on umbrella shops only when the weather at a user's current position is rainy". The information delivery server may acquire the dynamically changing information (weather information of a specific area in this example) from the presence service, or by other means.

In the above description, when user's presence information satisfies delivery conditions, the information delivery server transmits contents (delivery contents, transfer contents). However, instead of such immediate contents delivery, the information delivery server may transmit contents after interaction with users. Although, in this embodiment, contents registered by users are transmitted without modifications from the information delivery server, the information delivery server may convert the format and substance of the contents to meet communication means included in presence information of users to receive the contents before transmitting the contents. For example, depending on communication means of destination users, contents registered as text may be converted into sounds before transmitting the contents.

As has been described above, according to this embodiment, contents can be transmitted and received among users, with reduced leaks of personal information. According to the policy of the information delivery server 4, presentity identifiers and other presence information (position information and other information at the time of contents creation) may be displayed on the display screen of FIG. 17.

Second Embodiment

The first embodiment assumes that users know in advance contents to be obtained, in other words, channels to be subscribed to. However, generally, the users do not know such information. It is natural that users (administrators) having registered contents wish as many users as possible would browse the registered contents. Accordingly, in this embodiment, a channel searching server for searching for channels will be described.

Figure 18:
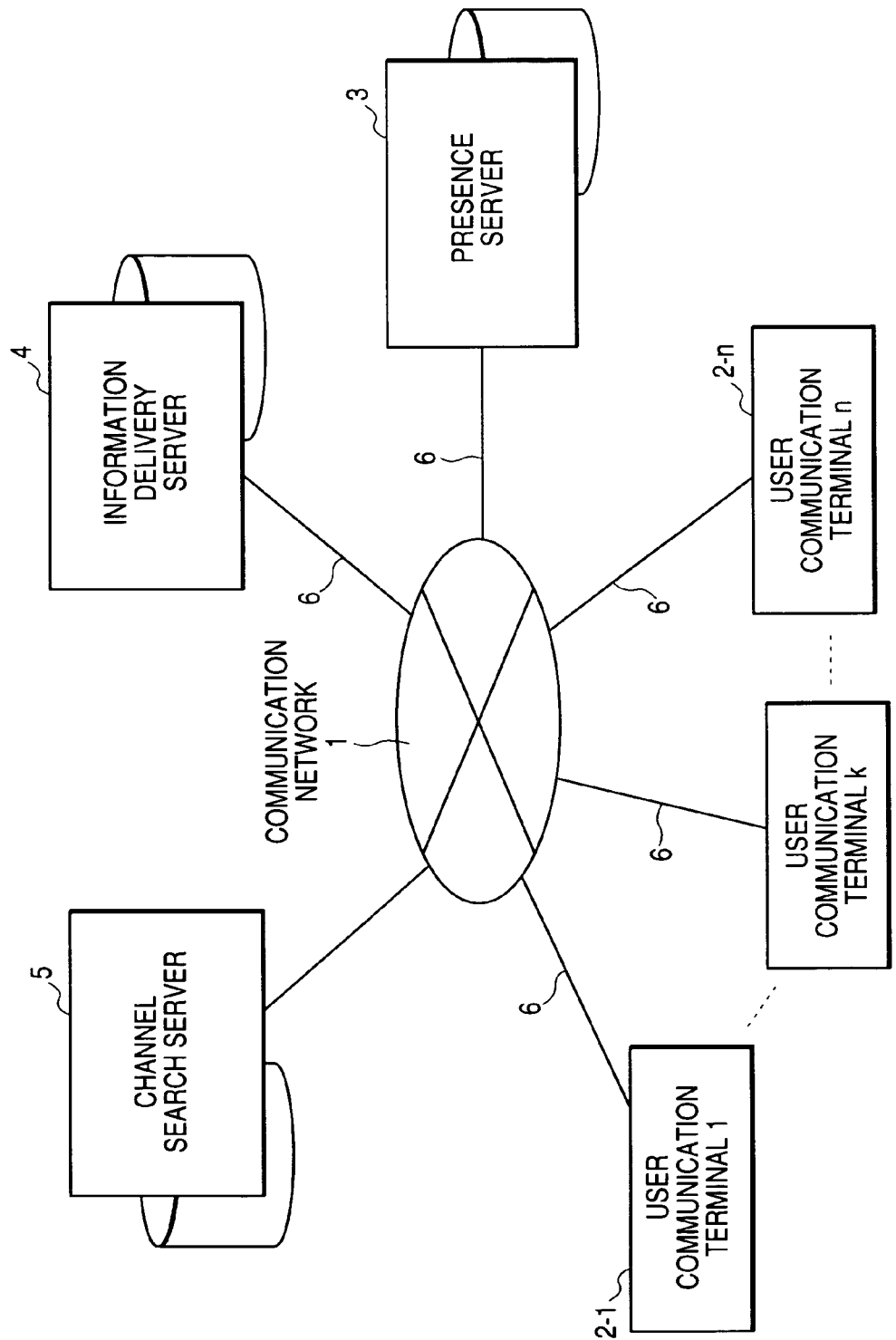
FIG. 18 is a drawing showing a physical configuration of a network assumed in a second embodiment.

FIG. 18 shows a physical configuration of a network assumed in this embodiment. This drawing is the same as the network configuration diagram shown in FIG. 1 except that a channel search server 5 that provides means for searching for channels is connected. When the channel search server 5 is connected, logically, a presentity of the channel search server 5 is formed on the presence service 10. According to the description based on the conceptual diagram shown in FIG. 2, a presentity for the channel search server similar to the presentities 14 (14-1 to 14-m) for the information delivery servers is opened on the presence service 10. Therefore, the channel search server 5 also behaves conceptually like one communication terminal having a presence client and a buddy list.

Figure 19:
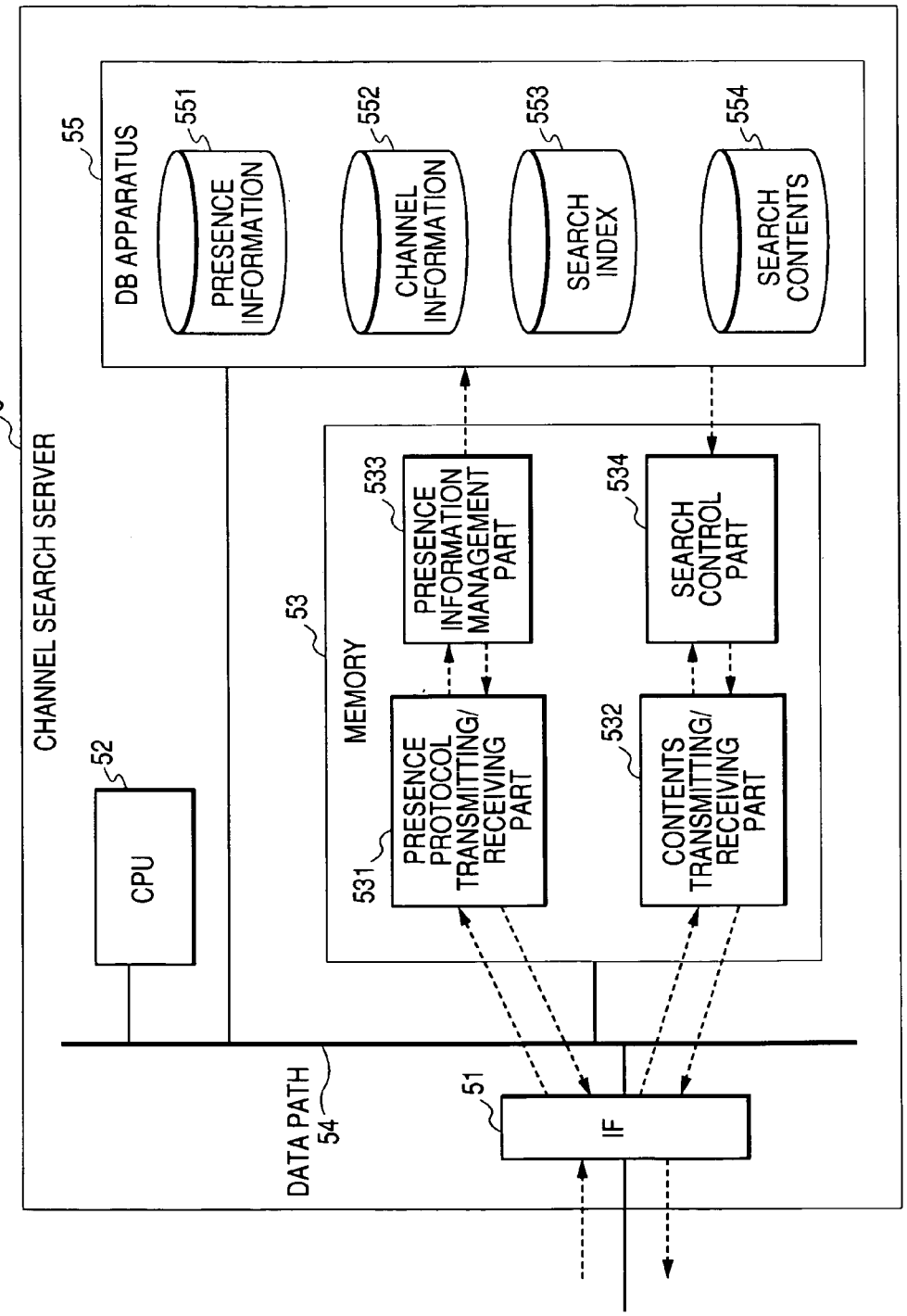
FIG. 19 is a block diagram showing functional expansion of the internal configuration of a channel search server.

FIG. 19 is a block diagram showing functional expansion of the internal configuration of the channel search server 5. In the drawing, the solid lines indicate physical connections of hardware, and the dotted lines with an arrow indicate a logical flow of information. The operation procedures of individual blocks of the channel search 5 are stored in a memory 53. During operation, a CPU 52 reads out and executes the operation procedures. Information managed by the channel search server 5 is stored in a DB apparatus 55 achieved by hard disk, from which required information is retrieved and written to the memory 53.

The memory 53 stores the following functional blocks: a presence protocol transmitting/receiving part 531; a contents transmitting/receiving part 532; a presence information management part 533; and a search control part 534. The DB apparatus 55 includes: a presence information table 551 that caches users' presence information; a channel information table 552 that stores channel information; a search index table 553 that stores information for searching for channels; and a search contents table 554 that stores contents for search results (hereinafter referred to as search contents) comprising all or part of delivery contents.

The channel search server 5 opens a dedicated presentity 15 to the presence service by an operation of the presence protocol transmitting/receiving part 531, and uses user's presence information acquired through it for searching. A search request and a search result are exchanged by contents transmission and reception performed based on the presence service. However, the exchange may be performed without going through the presentity 15 (for example, an interface for searching is opened as CGI on Web).

FIG. 20 shows a configuration of a search index table. The search index table 553 comprises a word field, and a search contents No. field that stores IDs of search contents in the search contents table, the search contents containing the word of the word field. FIG. 21 shows a configuration of the search contents table 554. The search contents table 554 comprises: a search contents No. field that stores the IDs; a channel No. field; a delivery condition field; a contents type field; a contents field in which contents are stored; and a rank field in which a digitized value of the popularity of a channel concerned is stored. The rank field, though not mandatory for searching, is required to provide various search options to users.

The presence information table 551 stores presence information about users who subscribe to the presentity of the channel search server. Specifically, the presence information table 551 is a table formed by caching presence information corresponding to the presentity identifiers of users who subscribe to the channel search server from the presence server 3. Concretely, it comprises: a user presentity identifier field; a nickname field; and a user position information field that stores user's position information. The channel information table 552 that stores channel information has almost the same structure as the table shown in FIG. 6. However, since channel numbers of the channel search server, and channel numbers of the information delivery server are managed independently of each other, channel numbers indicating a same channel do not always match. In this embodiment, since one information delivery server and one channel search server exist, channel numbers match between them.

Next, the operations of the channel search server 5 will be described with reference to the sequence diagram of FIG. 22, the functional block diagram of FIG. 19, and the channel information table of FIG. 6. A description below assumes that a user "Bob" corresponding to a presentity identifier "bob@example.co.jp" attempts to search for contents on "recommendable cakes" receivable at a current position. Also, it is assumed that a presence client provided in a Bob's terminal already knows the presentity search@example.co.jp of the channel search server.

Figure 22:
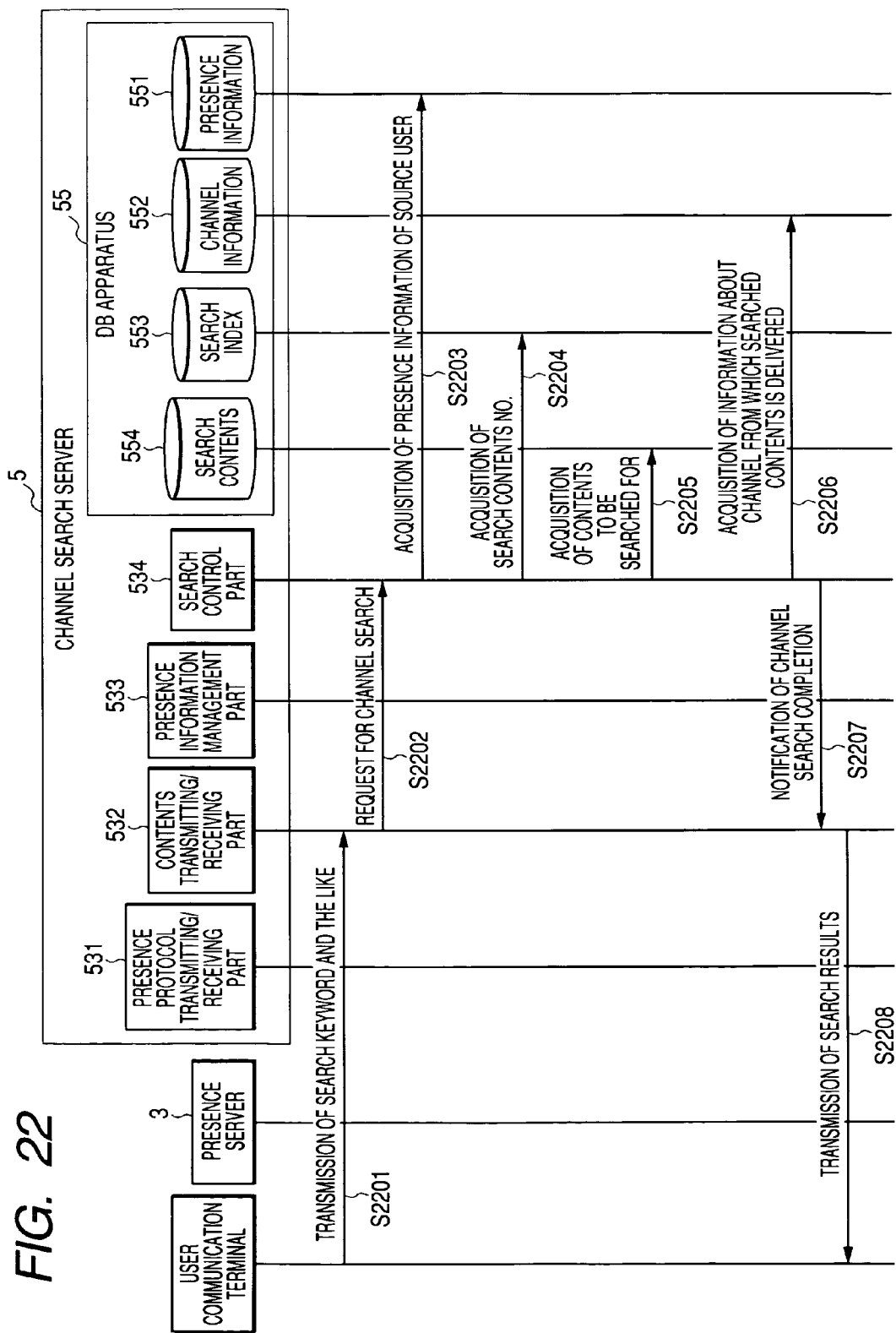
FIG. 22 is a drawing showing operation sequences when a channel search request is issued from a user communication terminal to a channel search server of a second embodiment.

FIG. 22 shows a sequence diagram showing coordinated operations between a user communication terminal and the channel search server 5, and internal operations of the channel search server 5 during searching for channels.

A search request including a search keyword and the like is transmitted from a Bob's user communication terminal 2 to the channel search server 5 (S2201). This embodiment assumes that a channel search request packet transmitted from the user "Bob" includes a search keyword "cake" and a user's nickname "Bob". The received search request packet is analyzed by the IF 51, and the nickname "Bob" and the search key word "cake" are extracted. The extracted information is transferred to the contents transmitting/receiving part 532, which requests the search control part 534 to search for the channel (S2202).

The search control part 534 uses the user's presentity identifier as a key to refer to the presence information table 551, and acquires presence information of the user transmitting the search request such as user's position information (S2203) Next, the search control part 534 refers to the search index table 553. It acquires the search contents numbers 1, 6, 7, and 15 of search contents including the user-specified search key "cake" (S2204). Upon acquiring the search contents numbers, the search control part 534 refers to the search contents table to acquire information of lines corresponding to the acquired search contents numbers. The search control part 534 further compares information stored in the delivery condition field of the acquired contents and the user's presence information, and sorts out proper contents (S2205). Plural contents may be sorted out or no contents may be sorted out.

As delivery conditions stored in the search contents table 554, like the delivery contents table 453 of the information delivery server 4, a function for judging contents delivery may be used. By passing user's presence information and the like to the stored function as arguments, deliverable contents can be identified. At this time, search results are ranked.

If the user-requested contents have been successfully found, the search control part 534 searches the channel information table 552 to acquire information (channel presentity identifier, channel name, etc.) of channels corresponding to the search contents sorted out (S2206). The search control part 534 transmits a search result to the user communication terminal 2 through the contents transmitting/receiving part 532 and the IF 51(S2207, S2208). Thus, the configuration and operation of the channel search server have been described. However, the above description contents are simply one embodiment, and a detailed method for performing channel searching is included in the scope of this embodiment within the scope of application of the prior art. In FIG. 18, a network in which only channel search server exists has been described. However, it goes without saying that plural channel search servers may exist.

As has been described above, the technique disclosed by this embodiment achieves contents-based channel search, greatly enhancing user convenience in contents delivery to an unspecific number of users.

Third Embodiment

Figure 23:
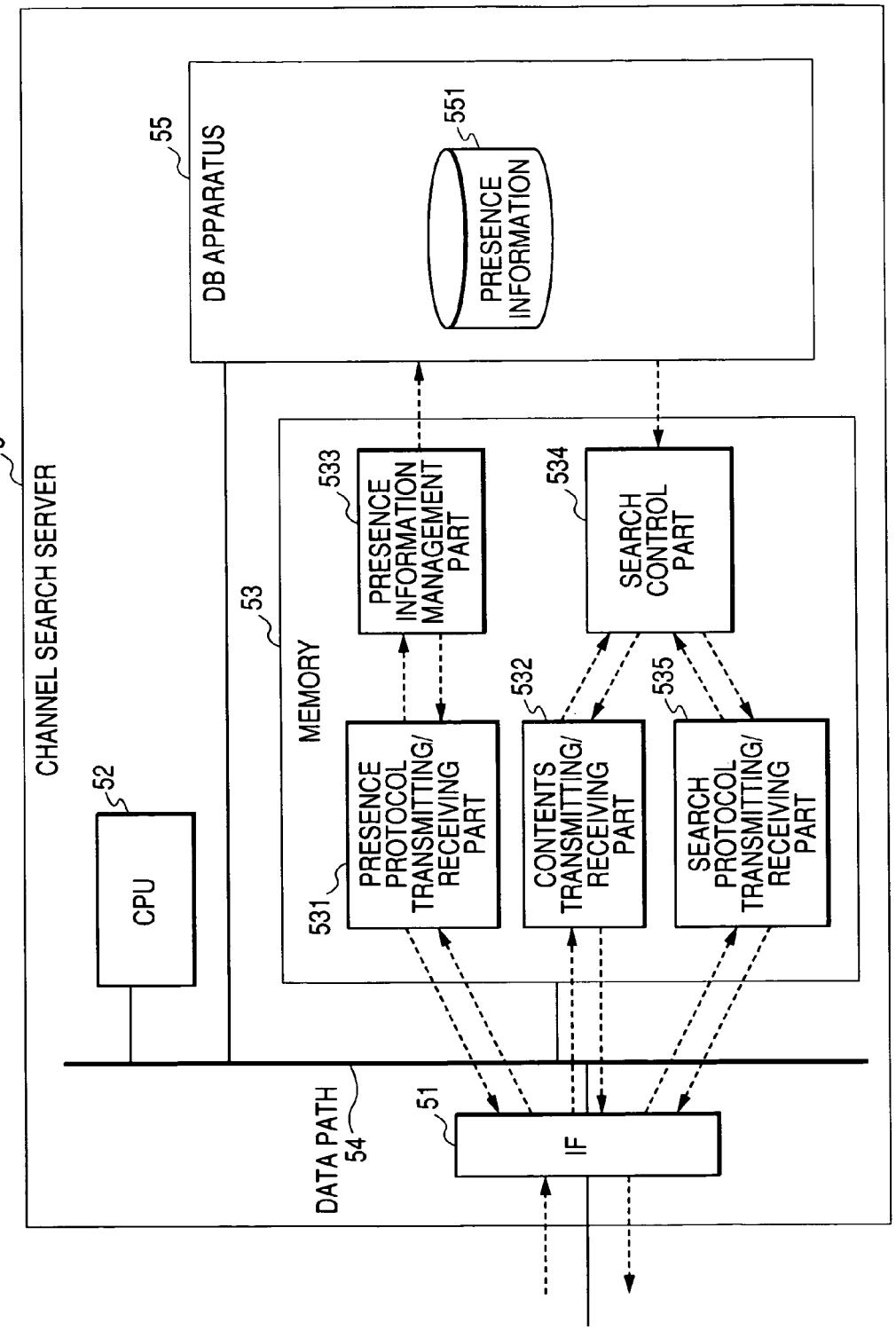
FIG. 23 is a functional block diagram of a channel search server of another configuration.

In this embodiment, another configuration of the channel search server will be described using two examples. The channel search server 5, without internally having information necessary for channel search, may issue a search request to the information delivery server 4 for each search request from users. FIG. 23 is a block diagram showing functional expansion of the internal configuration of the channel search server 5. This drawing is the same as FIG. 5, except for the memory 53 and the DB apparatus 55. The channel search server 5 of this embodiment does not have information necessary for channel search (channel information table 552, search index table 553, and search contents table 554) in the DB apparatus 55. Instead, it has a search protocol transmitting/receiving part 535 for requesting a search to the information delivery server 4. In this case, it is necessary that a specific protocol for channel search is defined between the channel search server 5 and the information delivery server 4, and the information delivery server 4 has information necessary for channel search in the DB apparatus 45.

Figure 24:
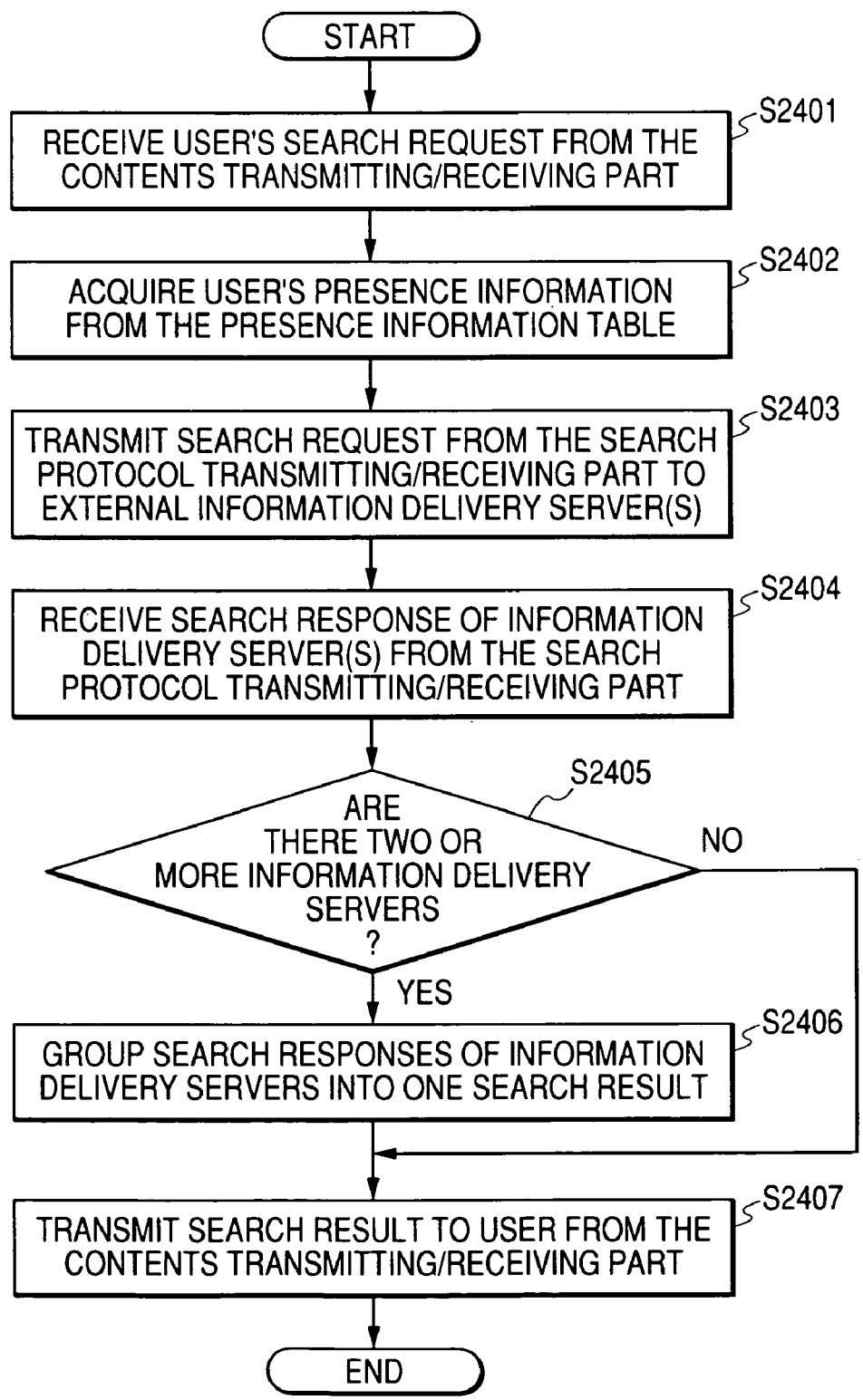
FIG. 24 is a flowchart showing internal operations of a channel search server shown in FIG. 23 when registering contents.

FIG. 24 is a sequence diagram showing an example of the operations of the search control part 534 when the channel search server 5 shown in FIG. 23 receives a channel search request. When the channel search server 5 receives a search request from a user, the search request is sent to the contents transmitting/receiving part 532 through the IF 51. The contents transmitting/receiving part 532 transmits it to the search control part 534 (S2401). The search control part 534 acquires presence information of the user transmitting the search request from the presence information table 551 (S2402) It combines the search request of the source user and the presence information to create a new search request, and transmits it to one or plural information delivery servers 4 through the search protocol transmitting/receiving part 535 (S2403). The search protocol transmitting/receiving part 535 transmits the search request to the information delivery server 4 through the IF 51.

In the information delivery server 4, a search result is created by some method and transmitted to the channel search server 5. The search result is sent to the search protocol transmitting/receiving part 535 through the IF 51. The search protocol transmitting/receiving part 535 transmits it to the search control part 534 (S2404). If the search request is to be issued to plural information delivery servers, the search control part 534 groups search responses of the information delivery servers into one result (S2405, S2406) and transmits it to the source user through the contents transmitting/receiving part 532 (S2407). The contents transmitting/receiving part 532 transmits it to the user communication terminal 2 through the IF 51.

As has been described above, since the channel search server does not have information necessary for channel search, the management of the channel search server is eased when plural information delivery servers are connected for contents delivery. This advantage is particularly effective when a provider of the channel search server 5 and a provider of the information delivery server are different. The channel search server in this embodiment is more advantageous than that in the second embodiment in terms of the scalability of the information delivery system.

Figure 25:
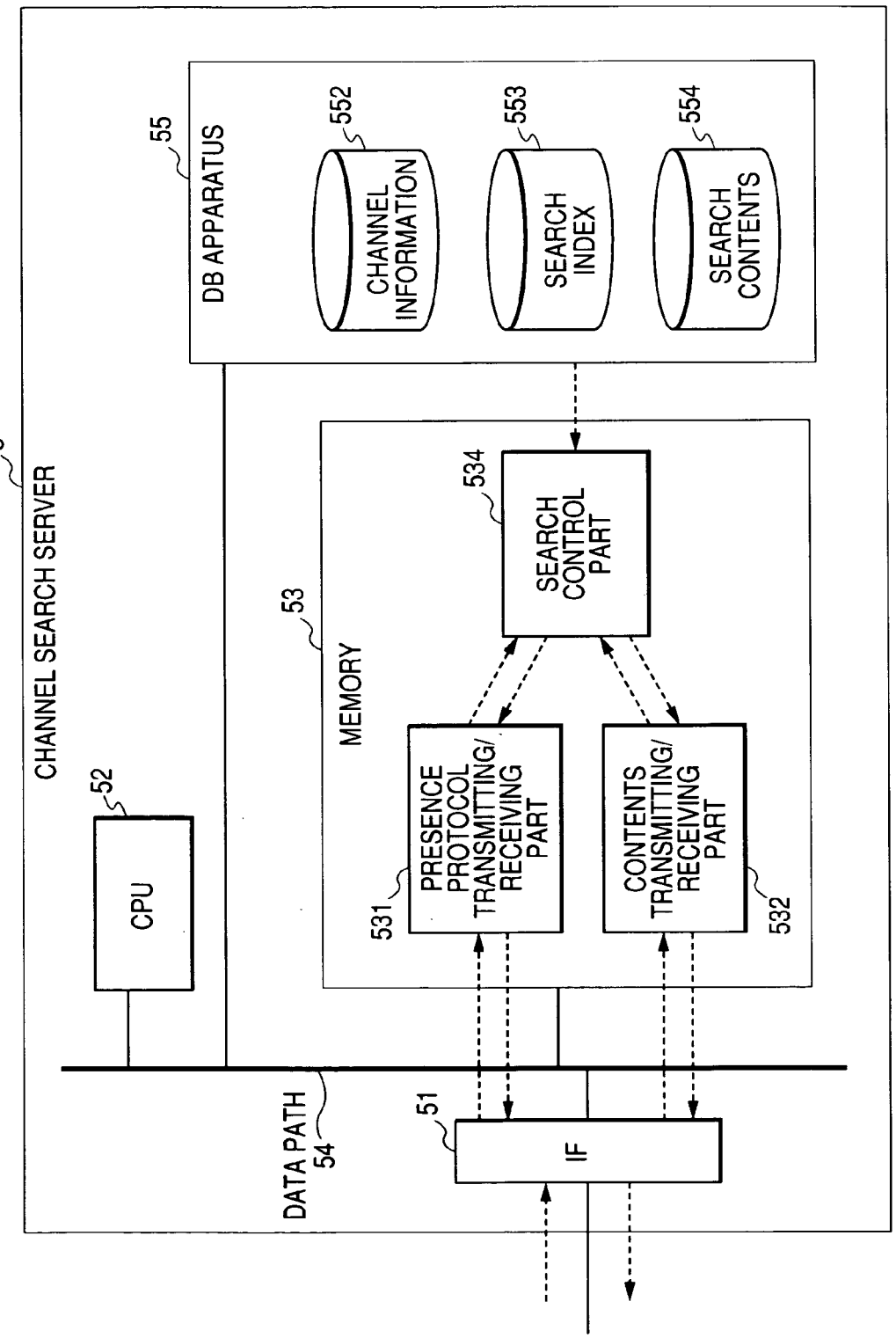
FIG. 25 is a functional block diagram of the channel search server of another configuration.
Figure 26:
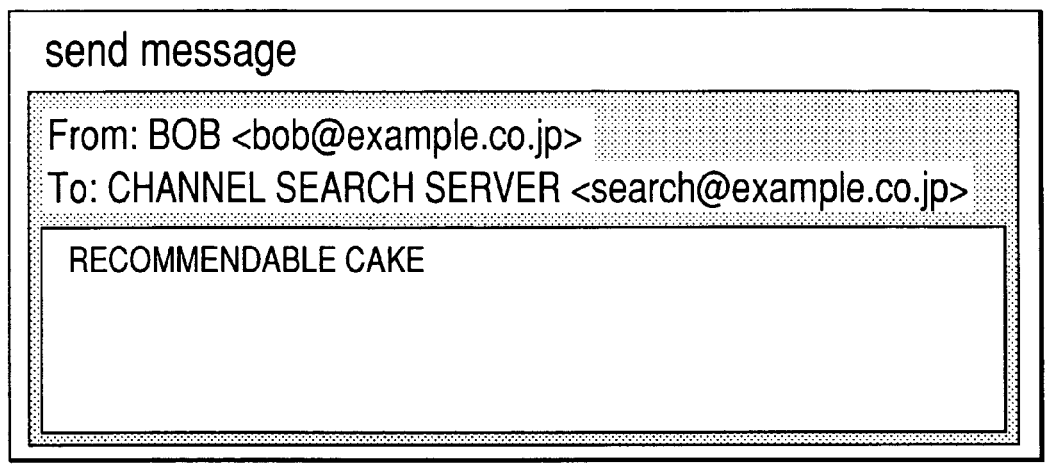
FIG. 26 is a drawing showing a display screen displayed in a user communication terminal when channels are searched.
Figure 27:
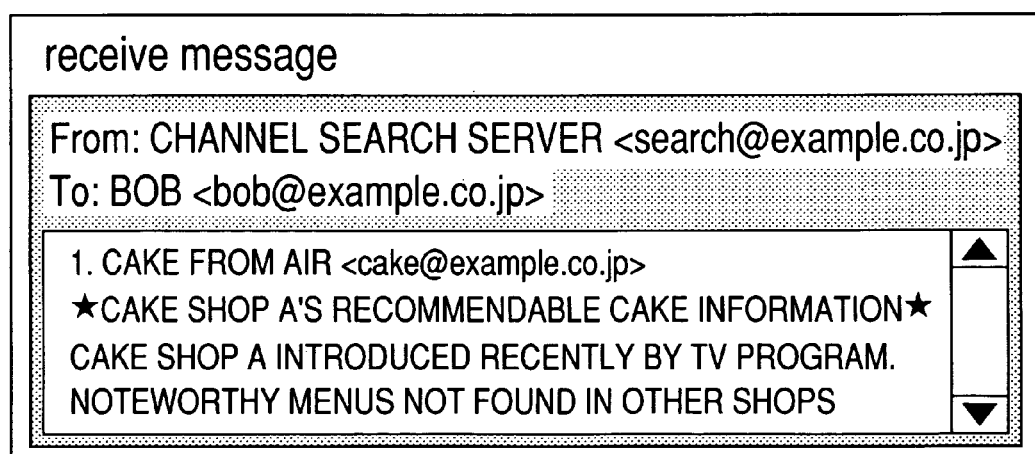
FIG. 27 is a drawing showing a display screen displayed in a user communication terminal when a search result is received from a channel search server.

FIG. 25 shows the channel search server of another configuration. The channel search server 5, without internally having a cache for user's presence information, may request presence information to the presence server 3 for each search request from users. FIG. 25 is a block diagram showing functional expansion of the internal configuration of the channel search server 5. This drawing is the same as FIG. 5, except for the memory 53 and the DB apparatus 55. The channel search server 5 does not have a cache (presence information table 551) for users' presence information in the DB apparatus 55. Instead, it requests presence information from the presence server 3 upon each receipt of a search request from a user. The channel search server 5 may have not the DB apparatus 55.

Fourth Embodiment

There have been one presence server 3 and one information delivery server 4 in the networks described in the first to third embodiments. However, plural presence servers and plural information delivery servers may be connected to the communication network 1. By increasing the number of the information delivery servers 4, the number of channels a push-type information delivery system 1 can accommodate can be increased. Since the present invention does not request specific modifications to the presence server 3, by thus increasing the number of the presence servers 3, the number of accommodable presentities of the presence service can be increased. This is not influenced by the number of the channel search servers and the information delivery servers.

In order that a channel administrator who delivers contents by using the present invention charges channel subscribers, both a presence server that manages user presentities and a presence server that manages channel presentities must have a function to authenticate users. This prevents the reception of delivery contents by impersonating authorized users. To get a proof of actual subscription by a third party other than channel subscribers and the information delivery server, one method is to have the presence server record subscribe logs.

Conceivable methods of charging channel subscribers include: the method of collecting a fixed charge in accordance with the term (month basis, etc.) of subscribing to a channel; the method of collecting charges in accordance with the length of the time of subscribing to a channel; and a method by which channel subscribers pay money to a channel administrator only when receiving valuable contents. When the last method is adopted, means for transmitting and receiving contents must have functions such as non-repudiation and replay prevention.

On the other hand, methods by which an administrator of the information delivery server charges users include the method of charging channel administrators for channel preparation fees and use frees (similar to rental of home pages on Web), and the method of inserting advertisements in delivery contents (similar to advertisements of e-mail magazines).

Hereinbefore, embodiments of the present invention have been described in detail with reference to the accompanying drawings. Actual system configurations are not limited to the embodiments and may include any designs and the like without departing from the spirit and scope of the present invention.

What is claimed is:

1. An information delivery method for delivering prescribed contents to users registered in advance on a network, the network comprising: a first terminal; a second terminal; a presence server that manages presence information of a first user of the first terminal and of a second user of the second terminal; an information delivery server that stores contents to be delivered to the first terminal; the second terminal; a communication network that establishes connection among the first terminal, the presence server, and the information delivery server to enable communication, wherein the information delivery method comprises the steps of:

forming a first presentity and a second presentity on the network sensed by the presence server, each of the first and second presentities being an account necessary for the first terminal or the second terminal to enjoy presence service;

providing the first presentity and a second presentity respectively with a first identifier and a second identifier for uniquely identifying the presentities;

forming at least one other presentity than the first and second presentities, which is an account necessary for the information delivery server to enjoy presence service;

providing each of said at least one other presentity with a respective identifier; and transmitting contents data and account information on the second presentity from the second terminal to said at least one other presentity of the information delivery server, wherein the second terminal is associated with said at least one other presentity connected to the communication network, the information delivery server associates the transmitted contents data with the account information on the second presentity and registers the contents data therein, and the information delivery server acquires presence information of the first user from the presence server through said at least one other presentity, and when the acquired presence information of the first user matches delivery conditions of the stored contents, delivers the contents data to the first user, with a delivery source of the contents as said respective identifier of said at least one other presentity.

2. The information delivery method according to claim 1, wherein the first terminal transmits prescribed contents to said at least one other presentity of the information delivery server, with a transmission source being set to the first identifier, wherein the information delivery server registers the transmitted contents, and when the presence information acquired from the presence server matches delivery conditions of the stored contents, delivers the contents to the second user, with a delivery source of the contents as said respective identifier of said at least one other presentity.

3. The information delivery method according to claim 1, disclosing said at least one other presentity to other terminal users connected to the communication network as a channel for delivering contents.

4. The information delivery method according to claim 3, wherein a channel search server for searching for the channel is connected to the communication network.

5. The information delivery method according to claim 4, wherein the channel search server holds information necessary to search for said respective identifier of said at least one other presentity and contents belonging to said at least one other presentity the information delivery server has, the information delivery method further comprising the step of:

transmitting a search request including information for searching to the channel search server to search for a channel relating to the search request.

6. An information delivery server that, on a network through which presence service to store and deliver presence information is provided by a presence server, delivers prescribed contents to user terminals that registered a specific channel, a first presentity and a second presentity being respectively formed on the network as an account necessary for a first terminal and a second terminal to enjoy presence service, at least one other presentity than the first and second presentities being formed as an account necessary for the information delivery server to enjoy presence service, each of the presentities being provided with an identifier for uniquely identifying said each presentity, the second terminal being associated with said at least one other presentity connected to the network, the information delivery server comprising:
- an interface for transmitting and receiving information to and from the network;
- a processor for processing information received from the interface and information transmitted to the interface;
- a storage for storing contents to be delivered;
- a user information table for managing information about users to which contents are to be delivered, of the registered user terminals;
- a channel information table for managing information about a channel that delivers contents to the user terminals; and
- a delivery contents table for storing contents and their delivery conditions,
- wherein the interface receives contents data and account information on the second presentity from the second terminal,
- the processor associates the received contents data with the account information on the second presentity and registers the contents data in the storage,
- the processor acquires presence information of the first user from the presence server through said at least one other presentity, and when the acquired presence information of the first user matches delivery conditions of the contents, delivers the contents data to the user terminals, with an identifier given to said at least one other presentity as a delivery source of the contents.

7. An information delivery server that, on a network through which presence service to store and deliver presence information is provided by a presence server, delivers prescribed contents to plural user terminals registered in advance, one presentity being formed for each one of the user terminals as an account with an identifier necessary to enjoy presence service, at least one other presentity than the presentities provided to the user terminals being formed for the information delivery server as an account with an identifier necessary to enjoy presence service,
- wherein the information delivery server receives contents data and account information on a first presentity from a first one of the user terminals which is associated with said at least one other presentity,
- associates the received contents data with the account information on the first presentity and registers the contents data therein, and
- includes a number of virtual channel communication terminals for delivering said contents data to a second one of the user terminals, and the number of the virtual channel communication terminals is equal to the number of channels the user terminals subscribe to.

8. The information delivery method according to claim 1, wherein each of said at least one other presentity corresponds to a channel managed by the information delivery server, respectively.

9. The information delivery server according to claim 6, wherein each of said at least one other presentity corresponds to a channel managed by the information delivery server, respectively.

10. The information delivery server according to claim 7, wherein each of said at least one other presentity corresponds to one of the channels managed by the information delivery server, respectively.

* * * * *